March 17, 1970 S. M. WEIR ET AL 3,501,622
TICKET CREDIT ACCOUNTING SYSTEM
Filed April 5, 1966 19 Sheets-Sheet 1
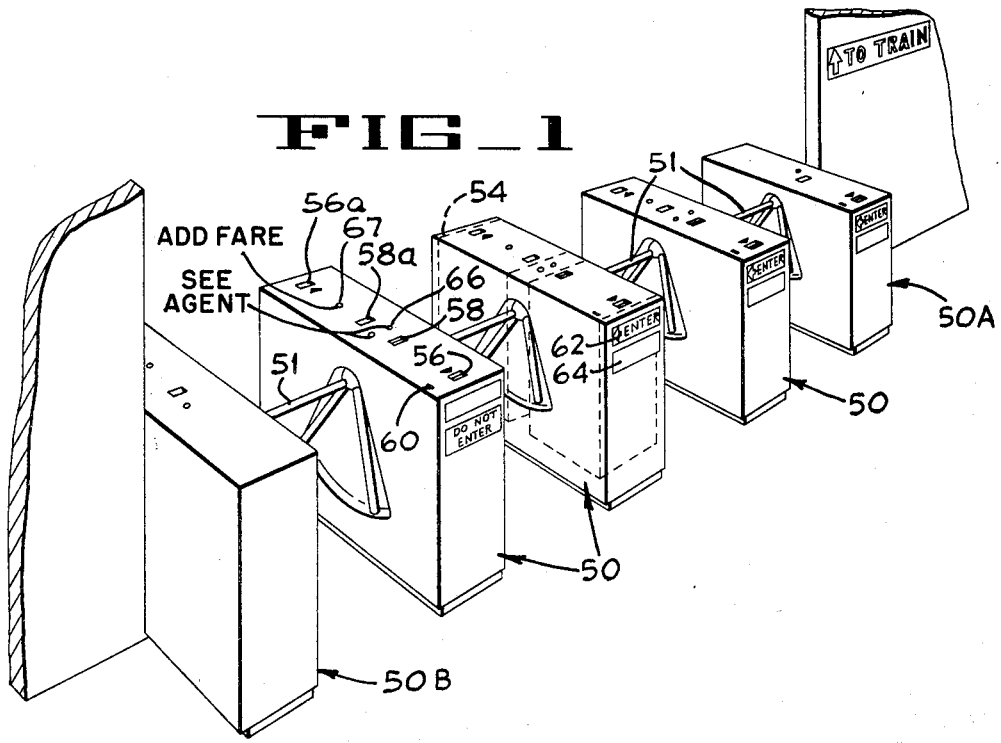
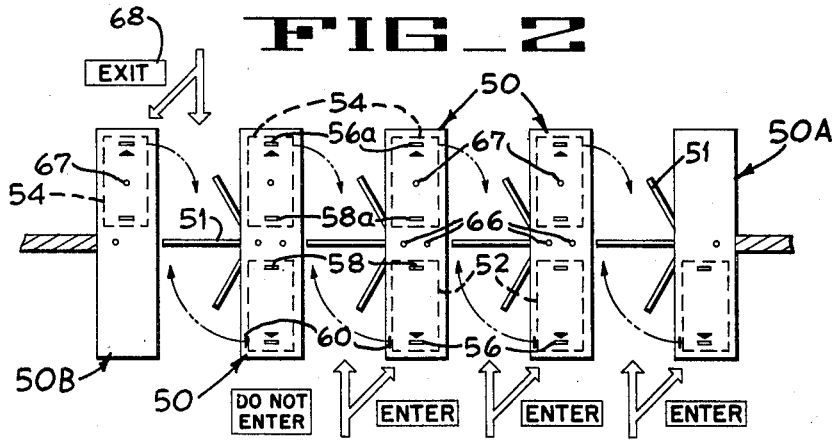
INVENTORS
STANLEY M. WEIR, ADRIAN P. ELICH
RICHARD HEANEY, CHESTER SZYMANSKI
FRANK S. CHYTIL
BY
Francis W. Anderson ATTORNEY

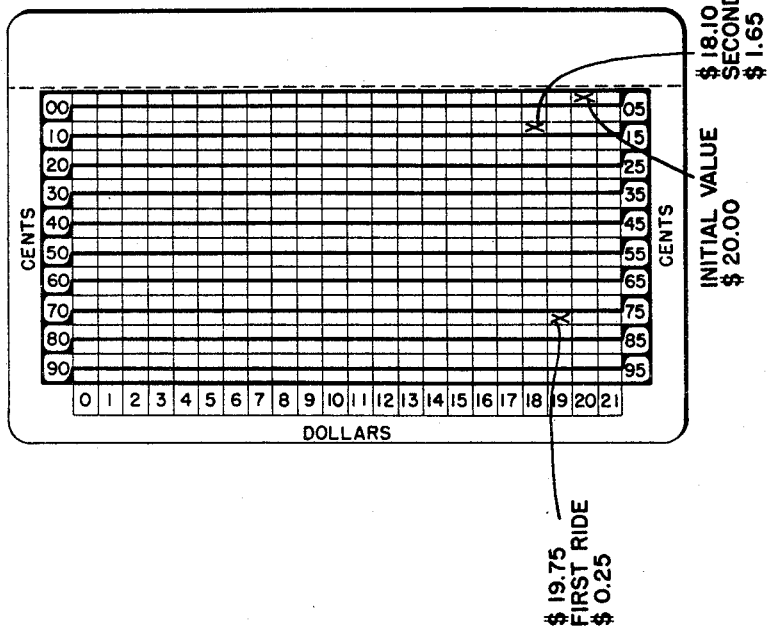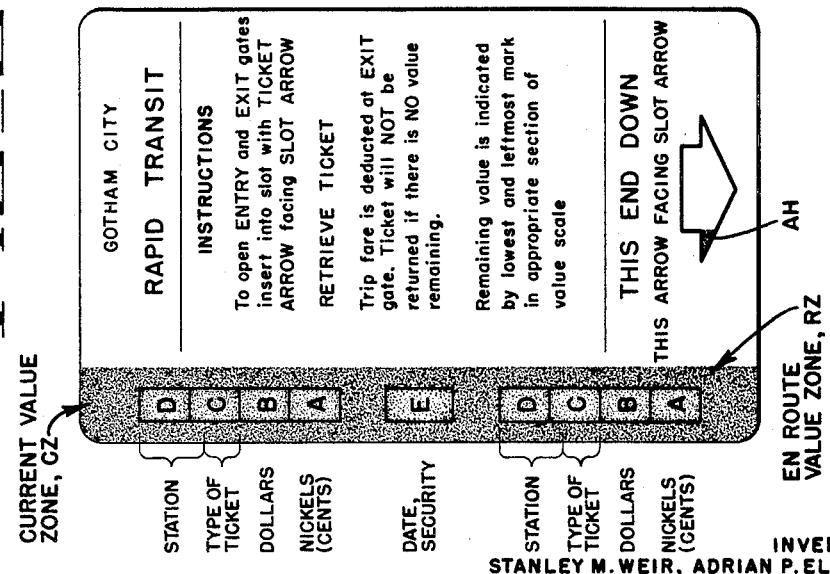

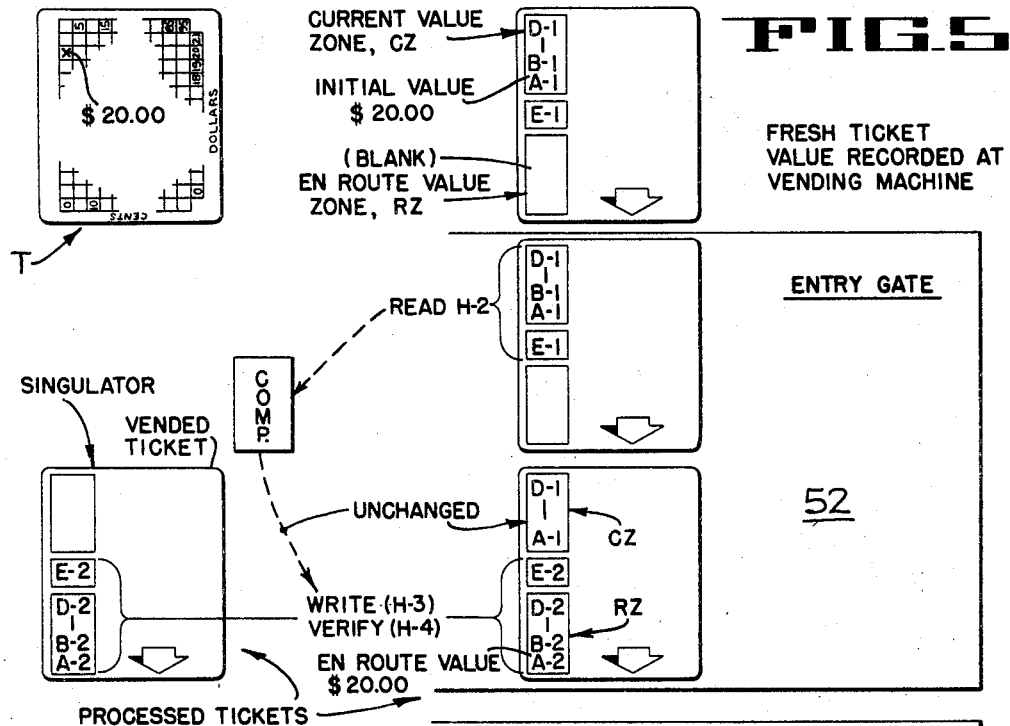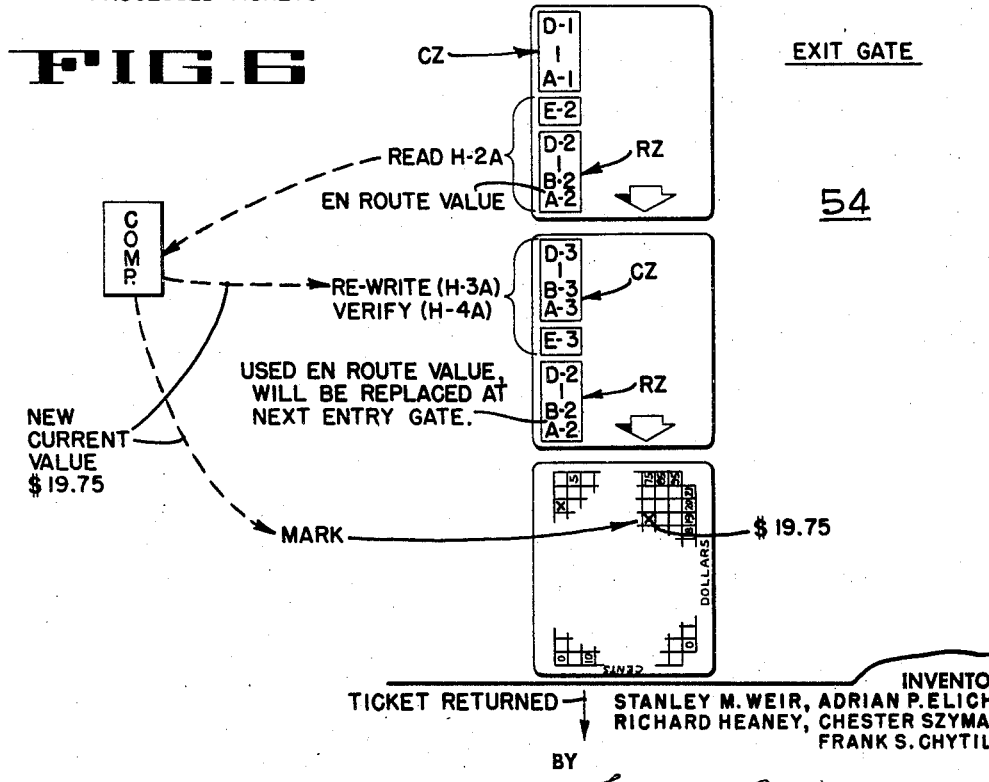

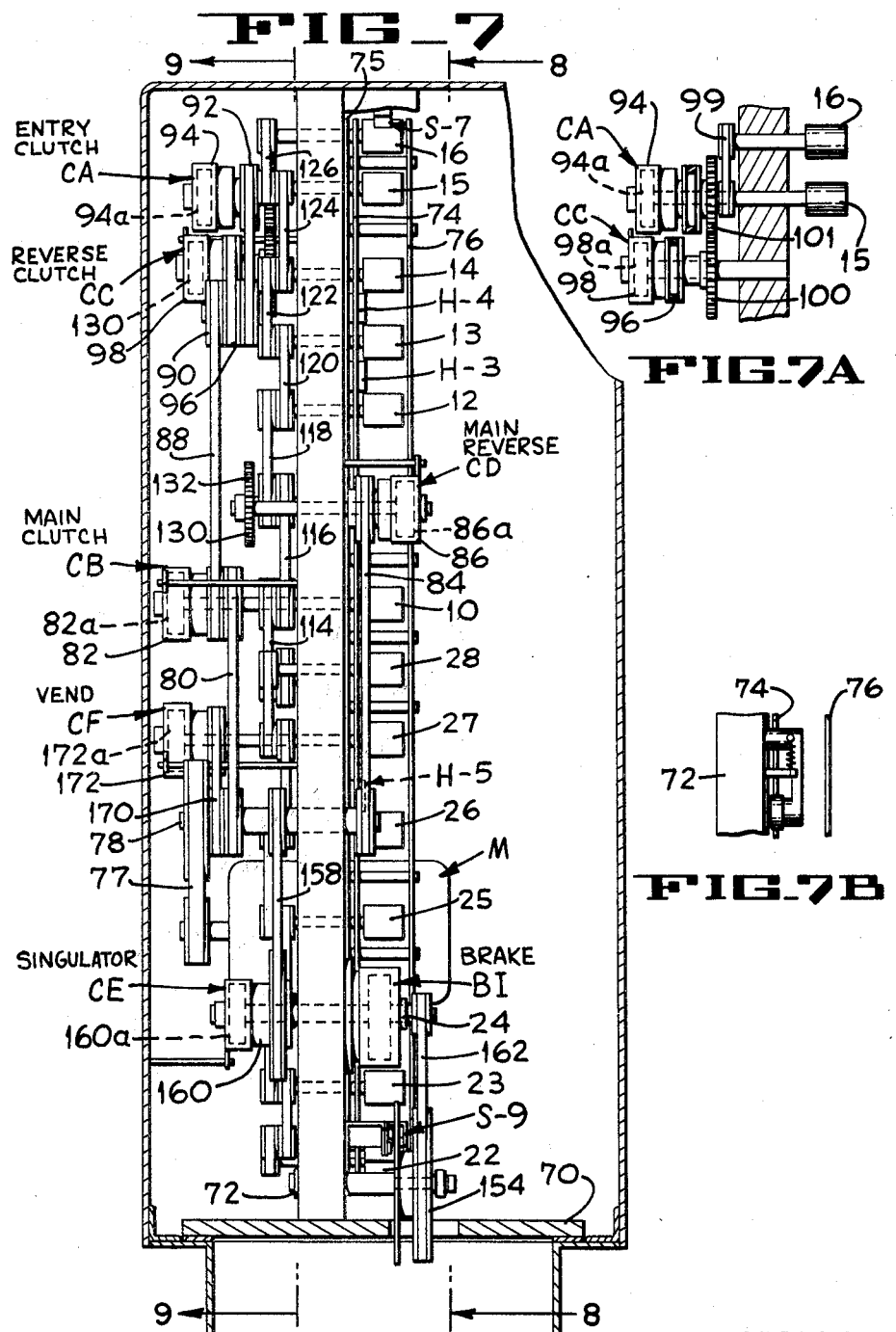

March 17, 1970
S. M. WEIR ET AL
3,501,622
TICKET CREDIT ACCOUNTING SYSTEM
Filed April 5, 1966
19 Sheets-Sheet 5
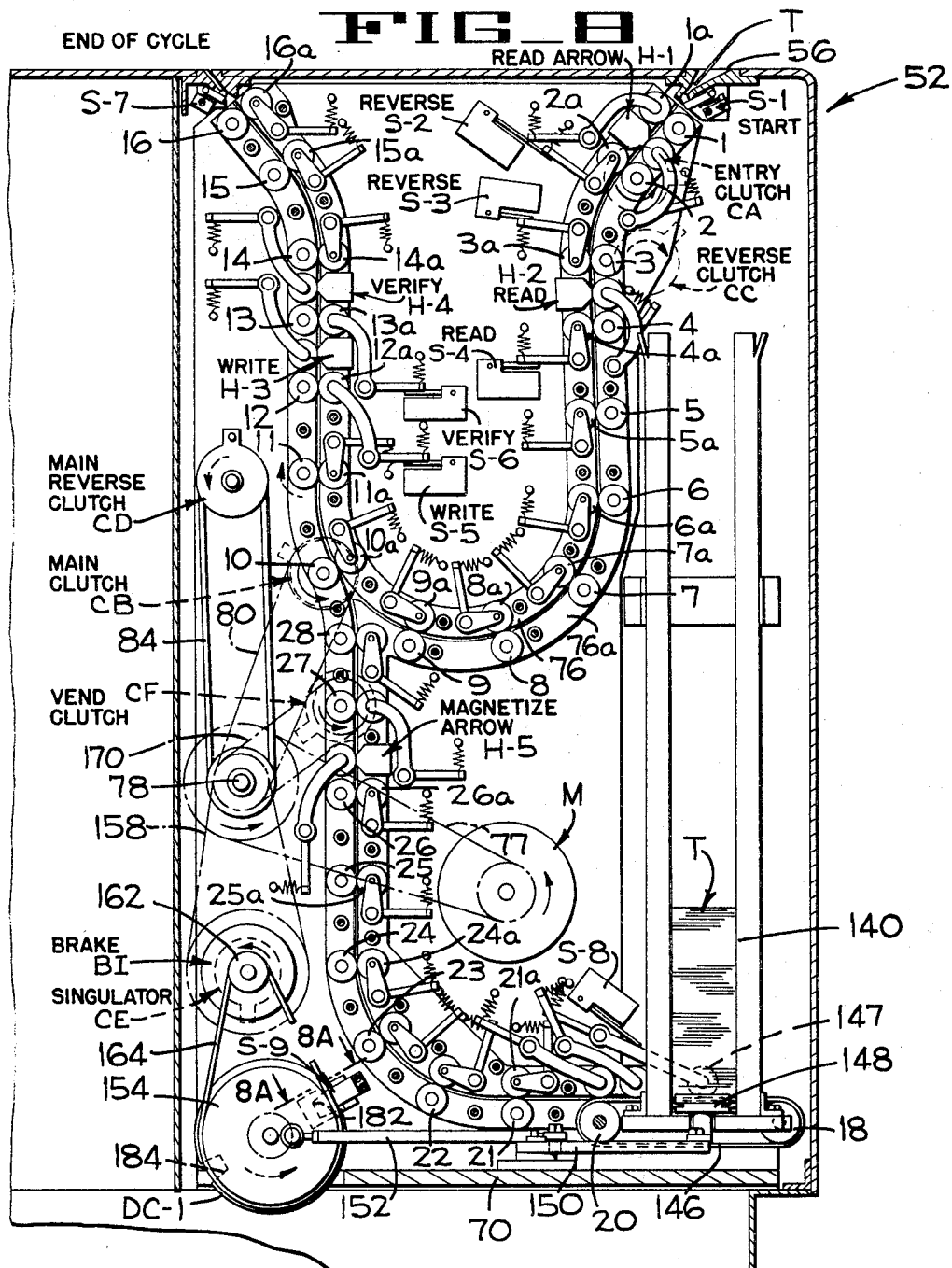
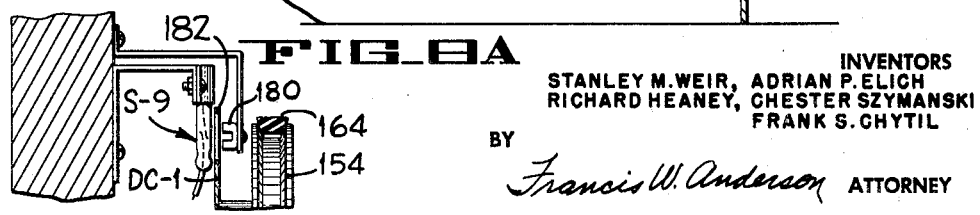
INVENTORS
STANLEY M. WEIR, ADRIAN P. ELICH
RICHARD HEANEY, CHESTER SZYMANSKI
FRANK S. CHYTIL
BY Francis W. Anderson ATTORNEY

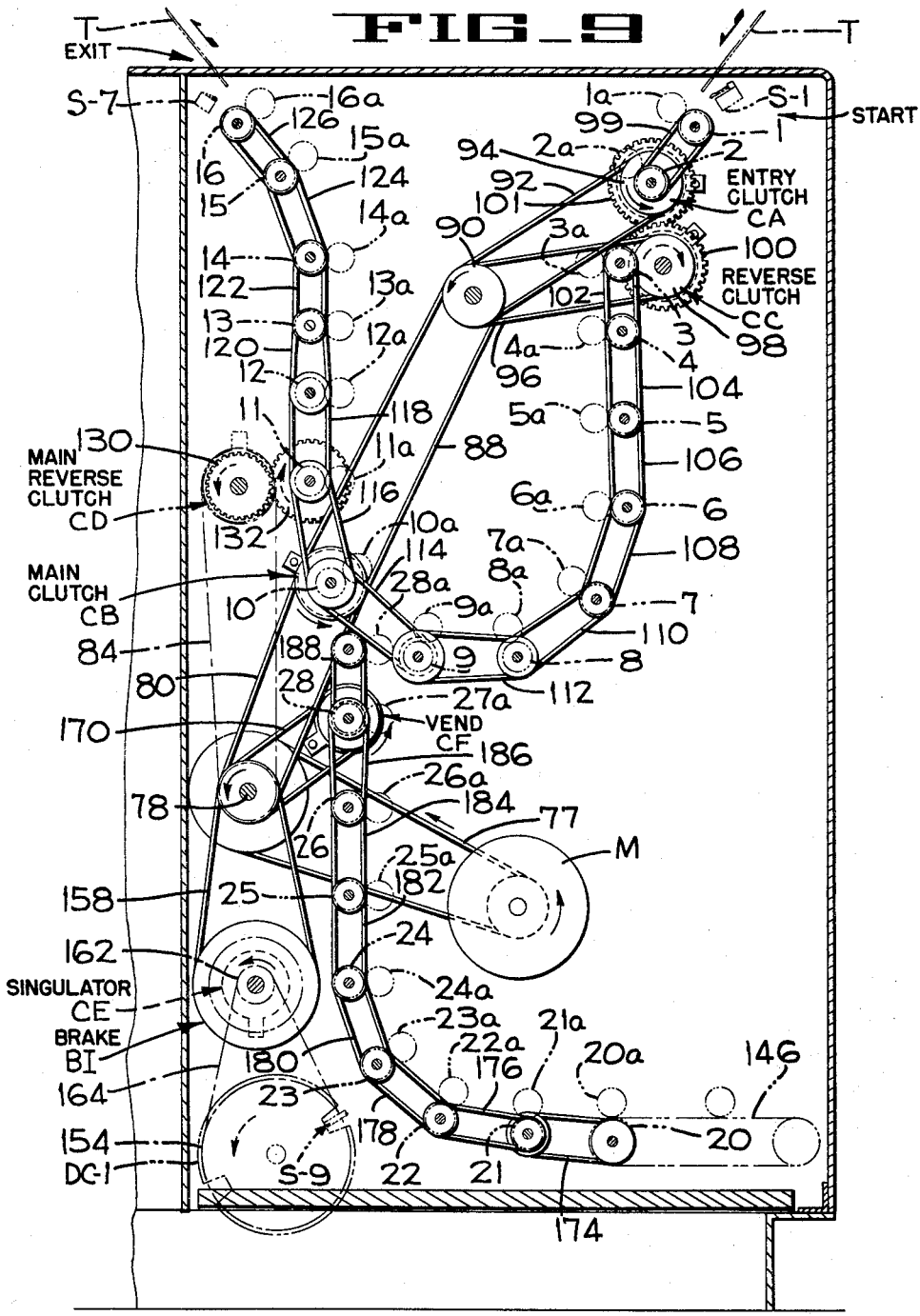

March 17, 1970 S. M. WEIR ET AL 3,501,622
TICKET CREDIT ACCOUNTING SYSTEM
Filed April 5, 1966 19 Sheets-Sheet 7
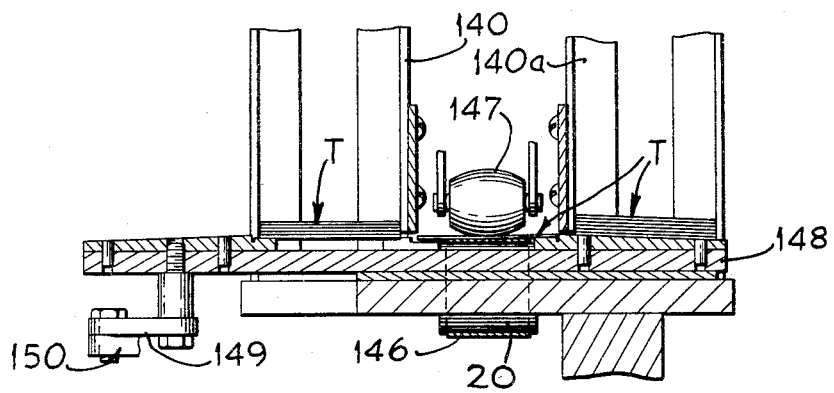
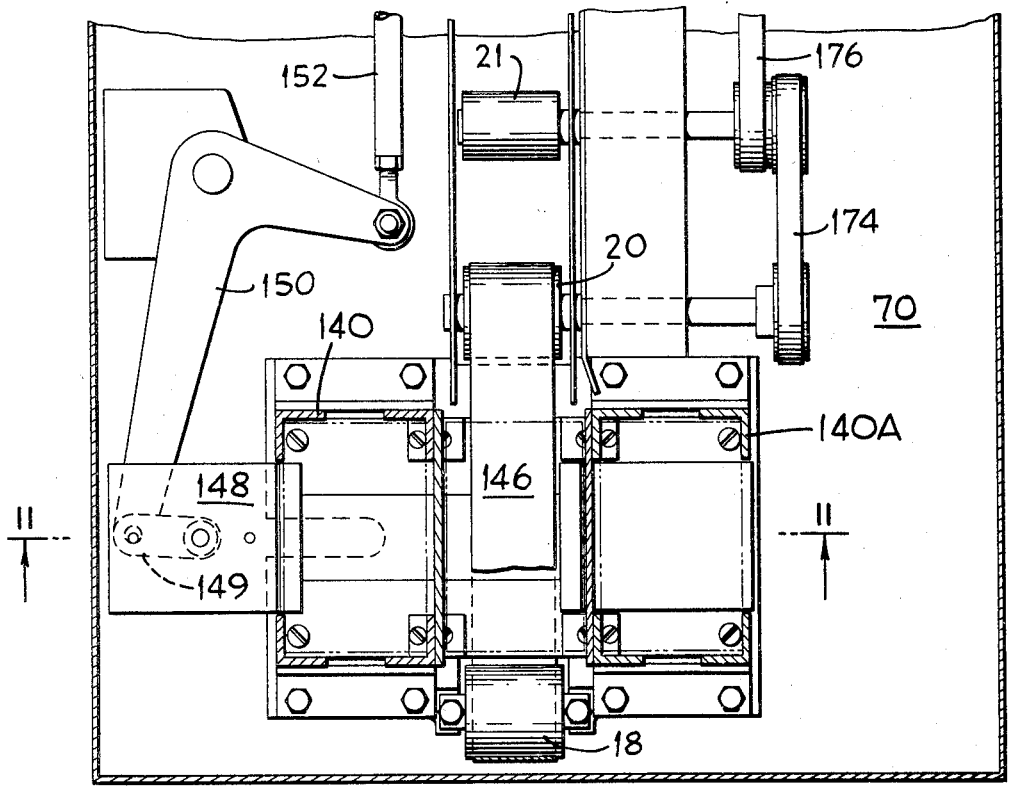
INVENTORS
STANLEY M. WEIR, ADRIAN P. ELICH
RICHARD HEANEY, CHESTER SZYMANSKI
FRANK S. CHYTIL
BY
Francis W. Anderson  ATTORNEY

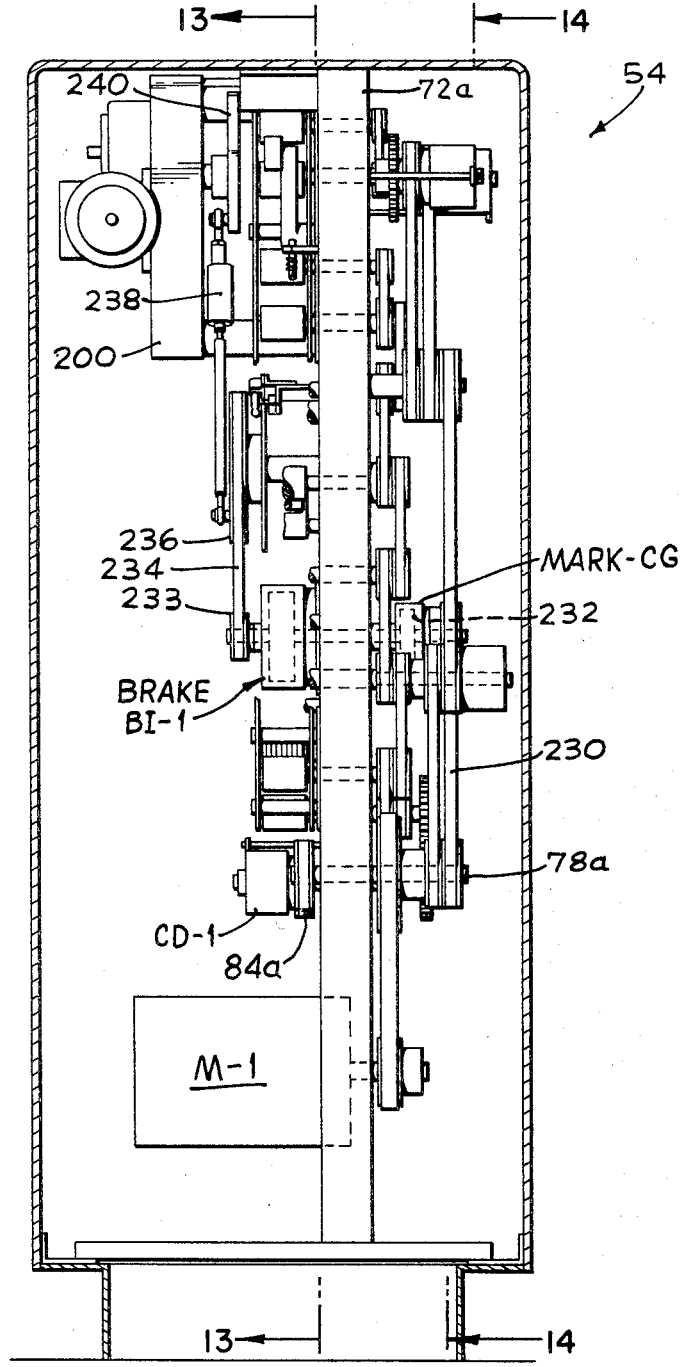

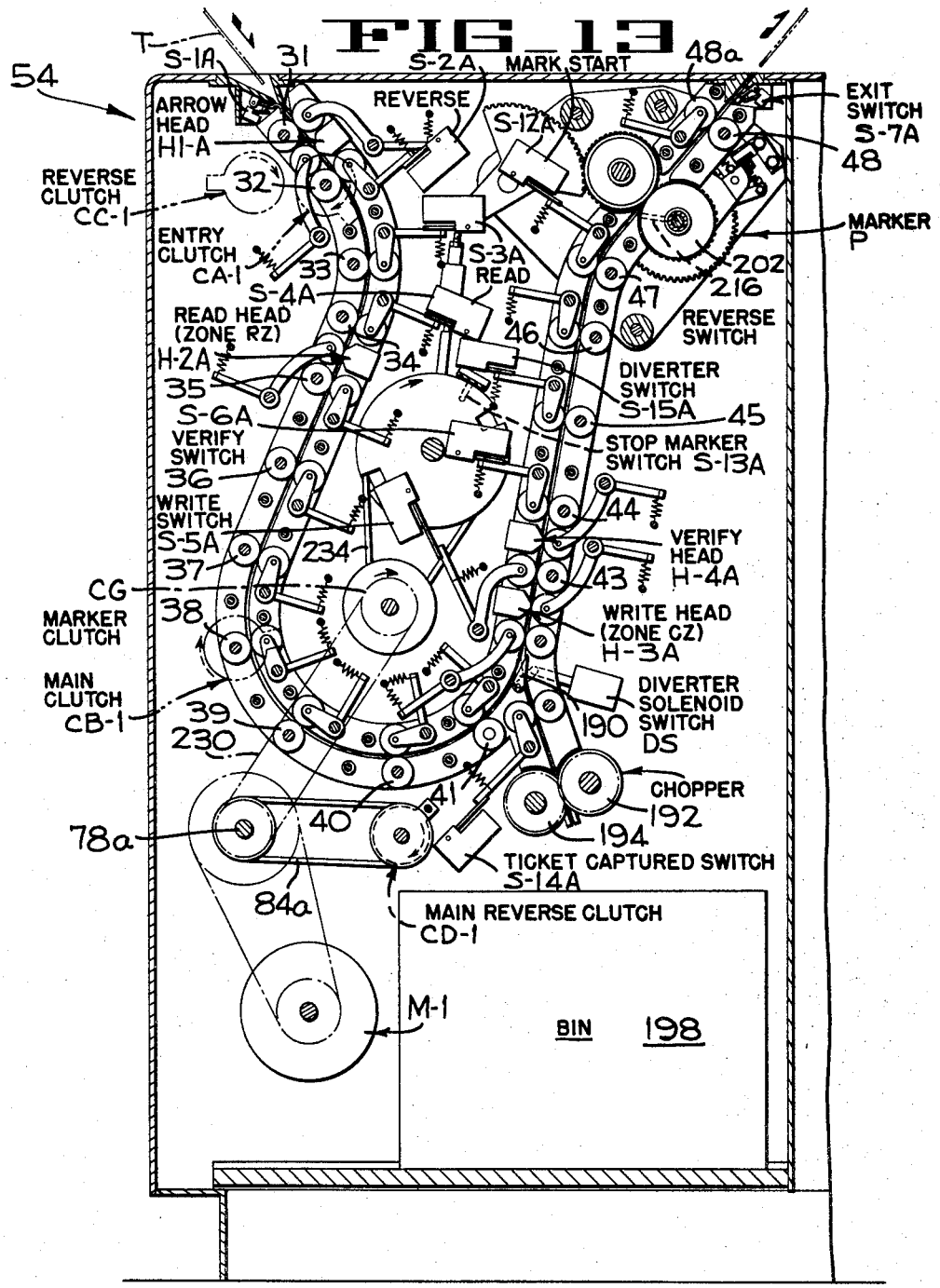

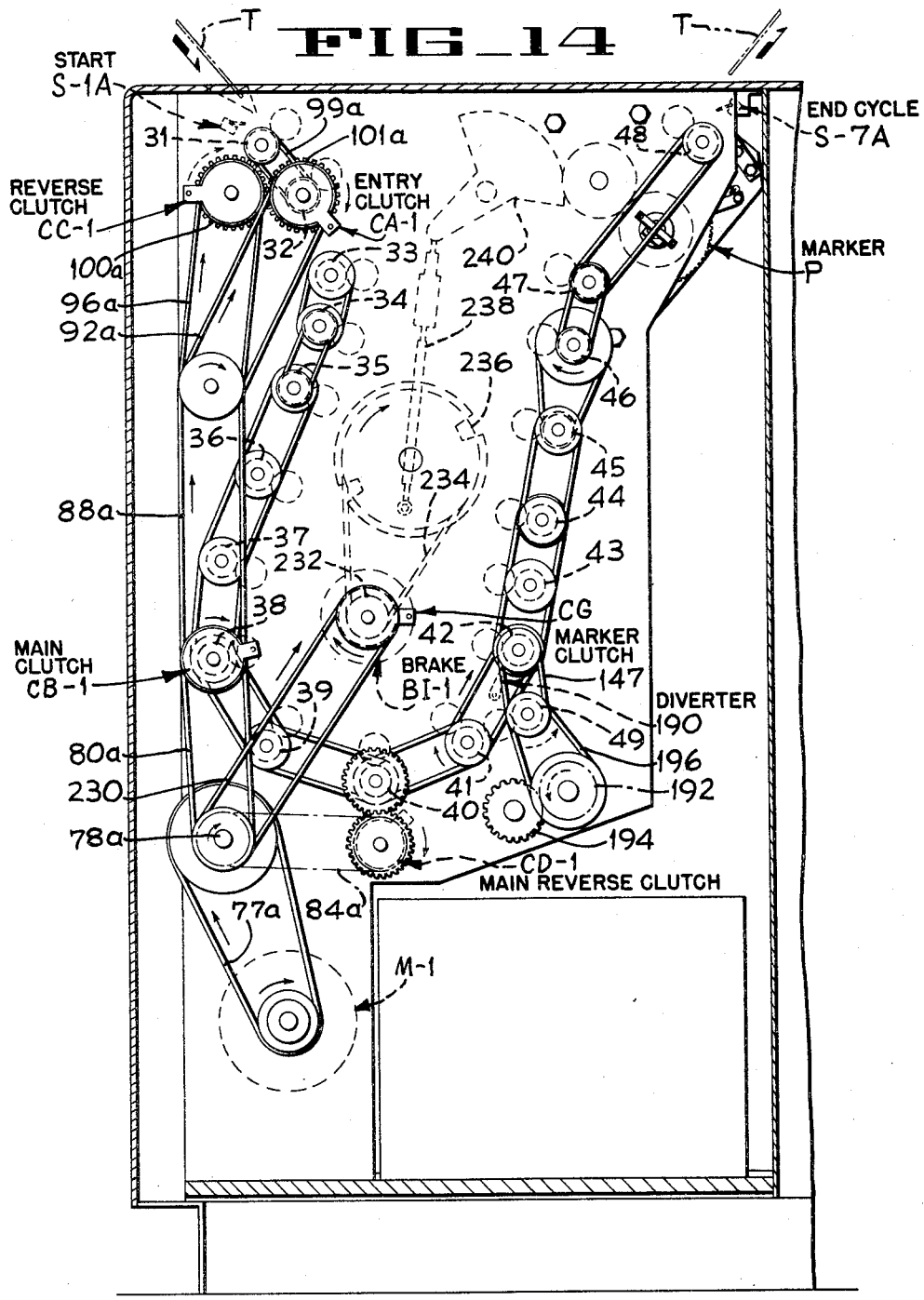

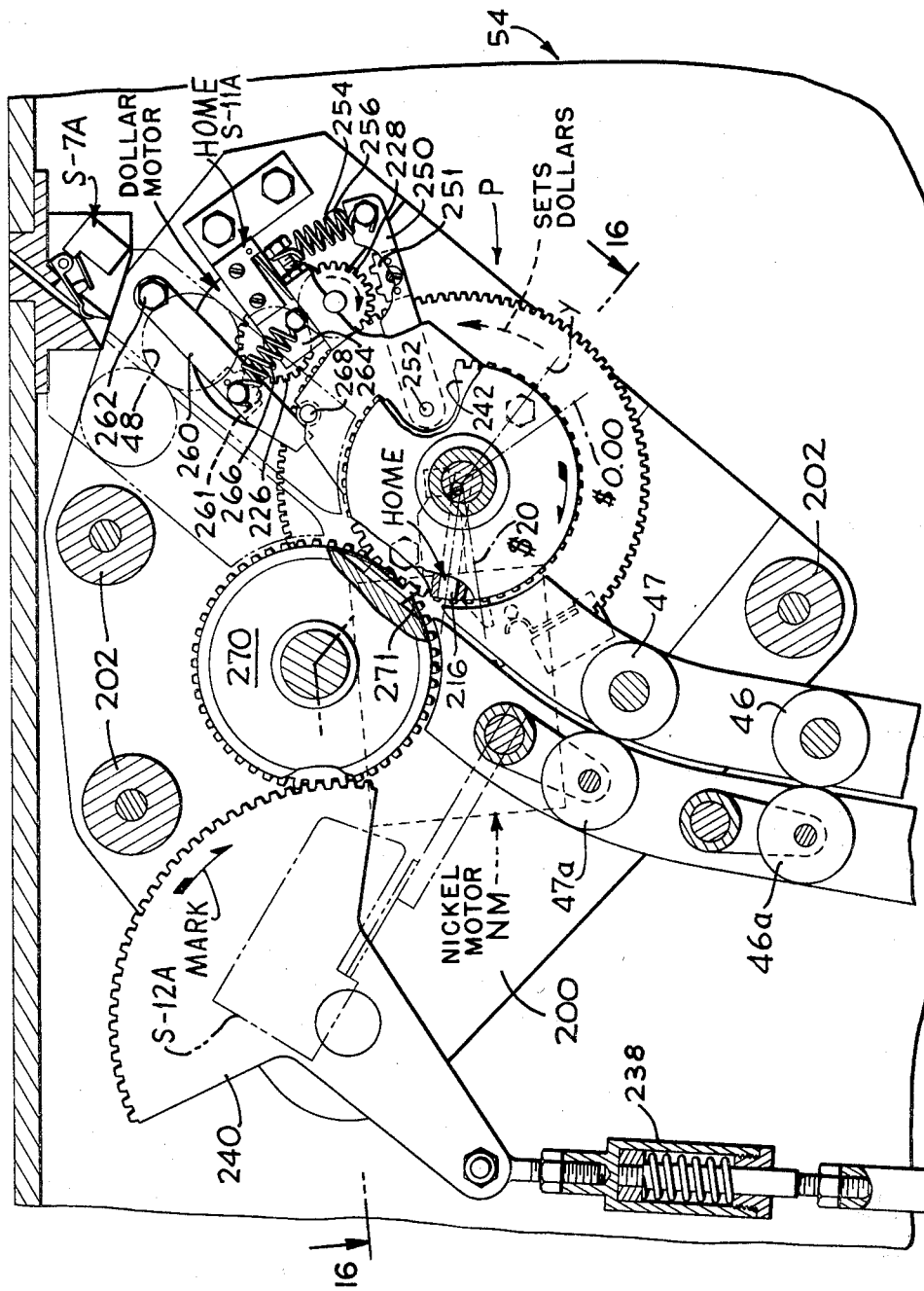

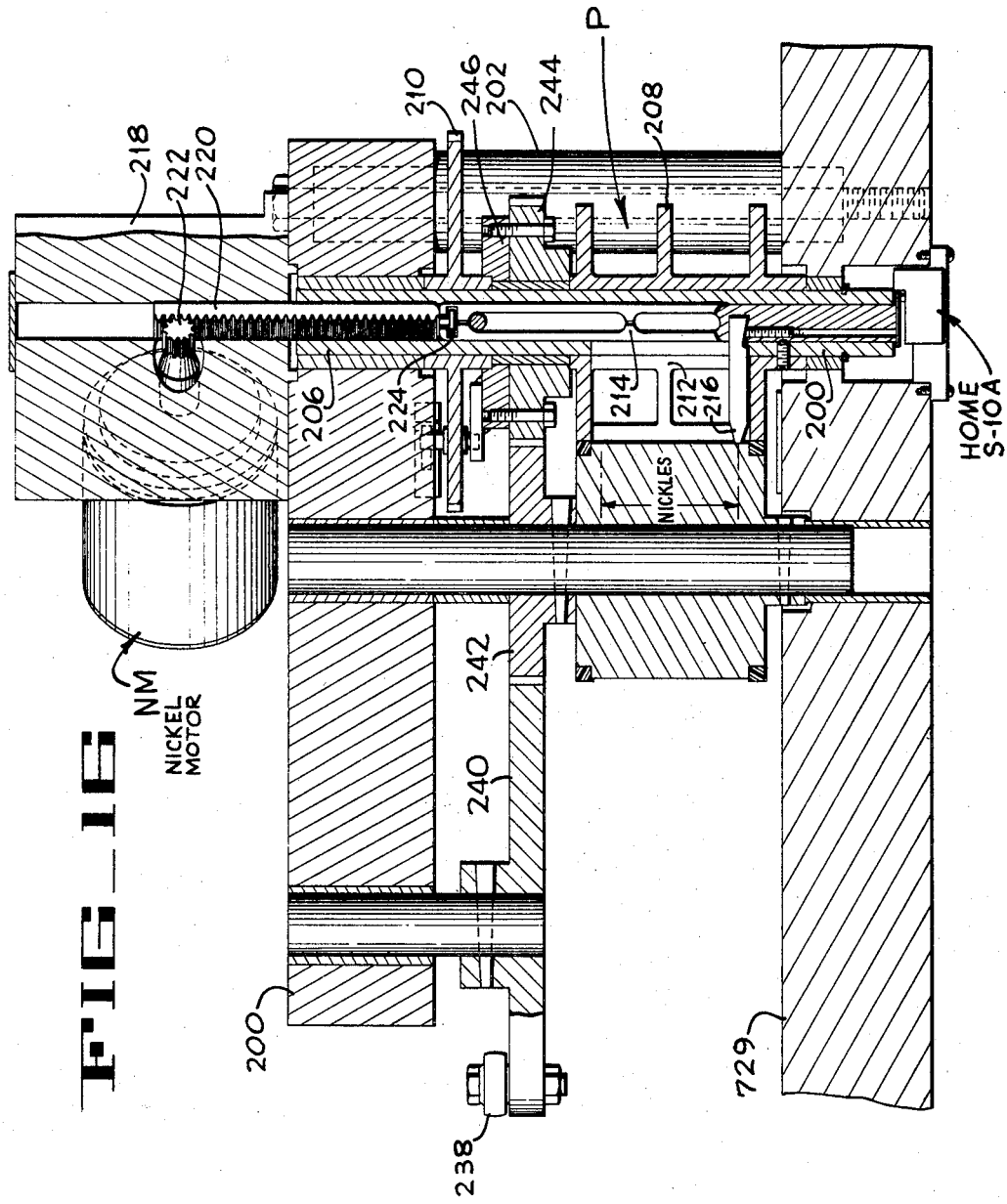

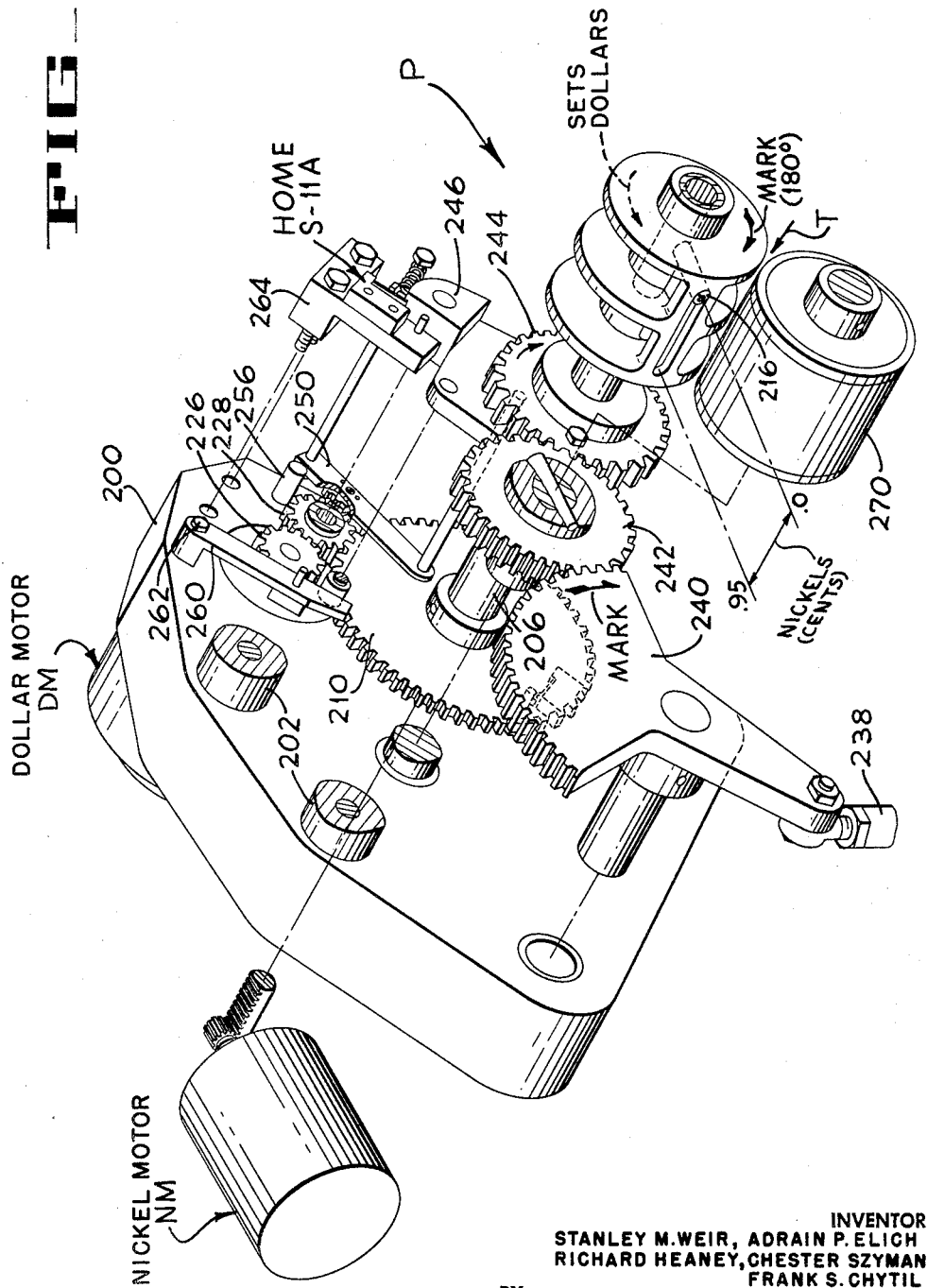

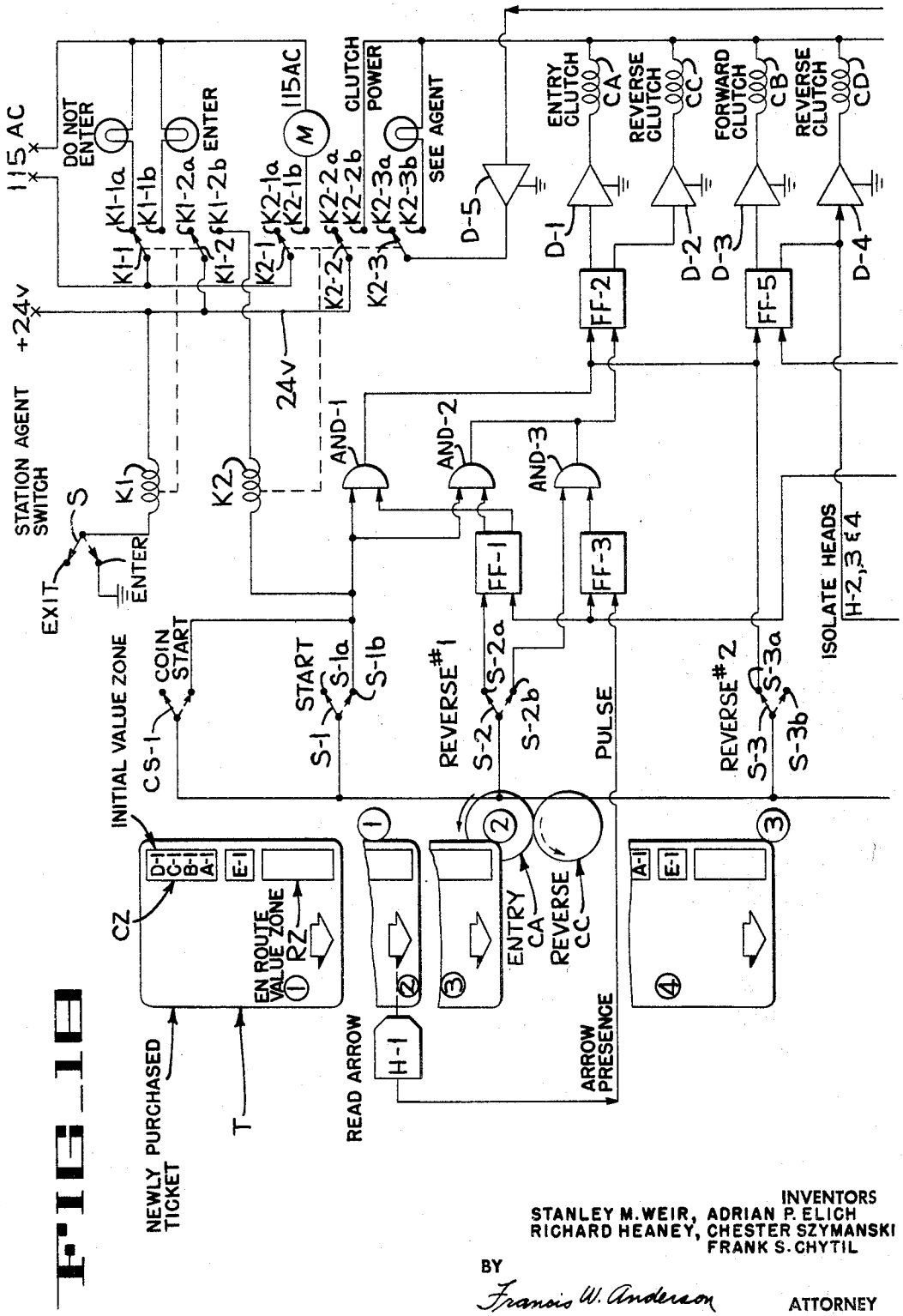

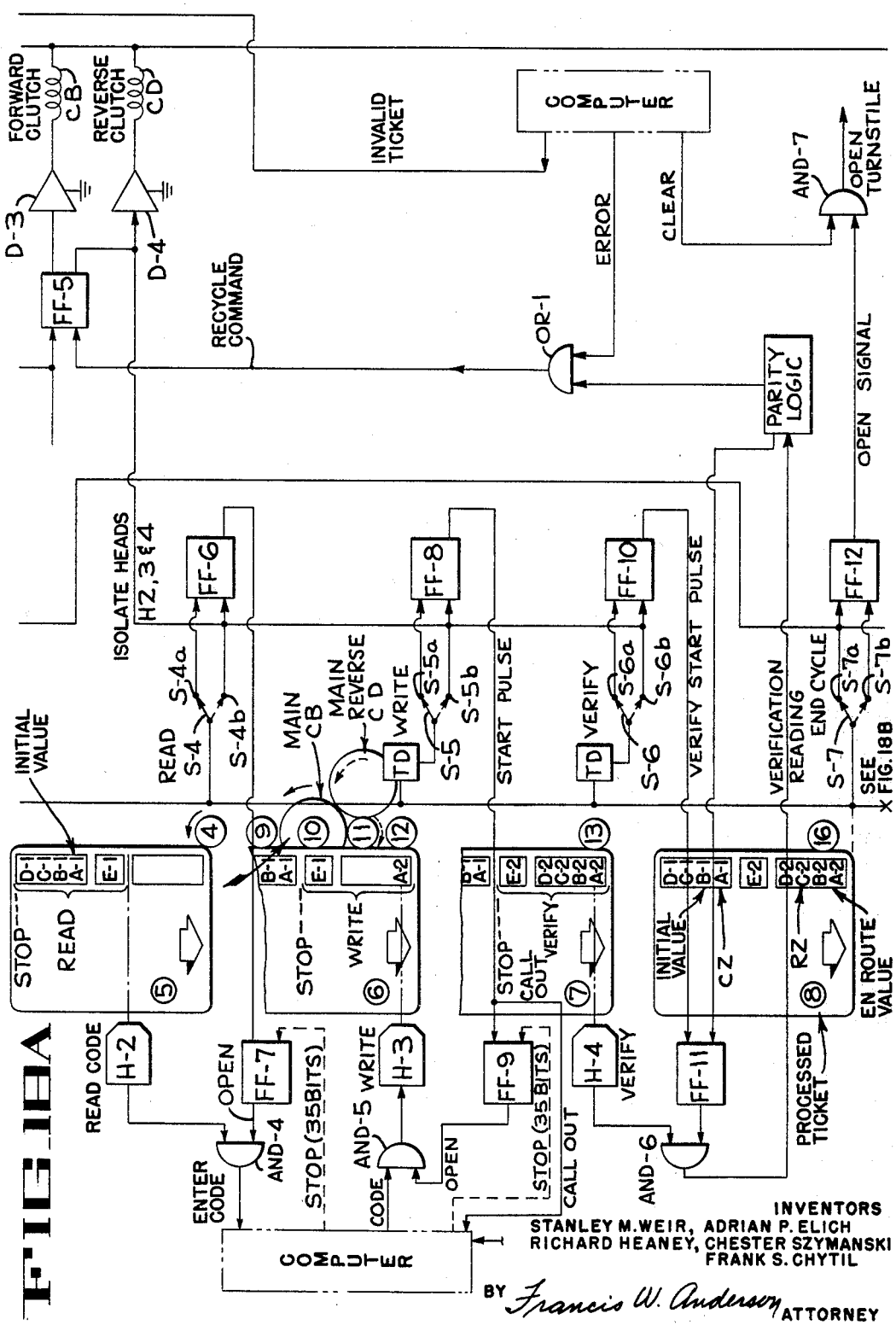

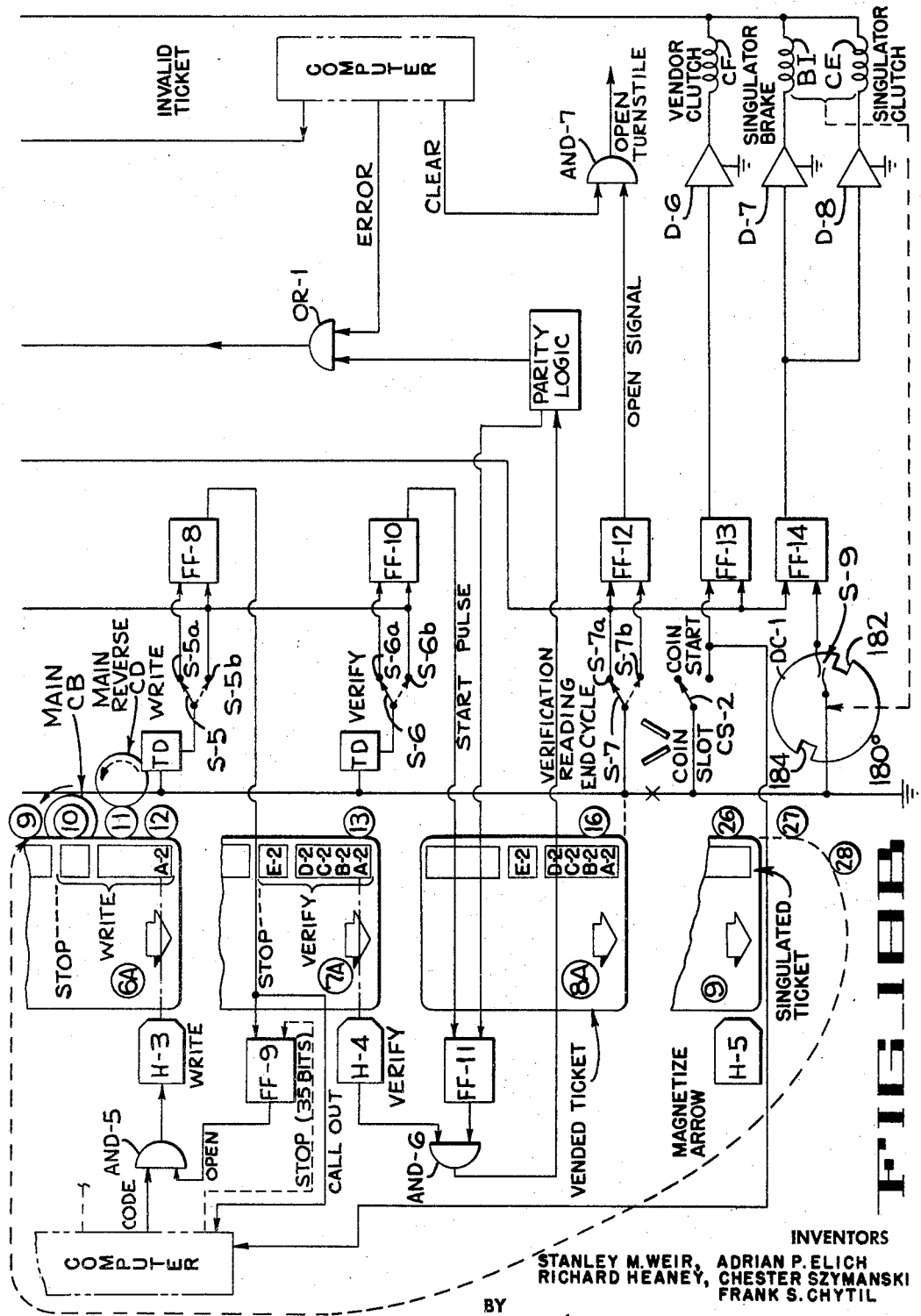

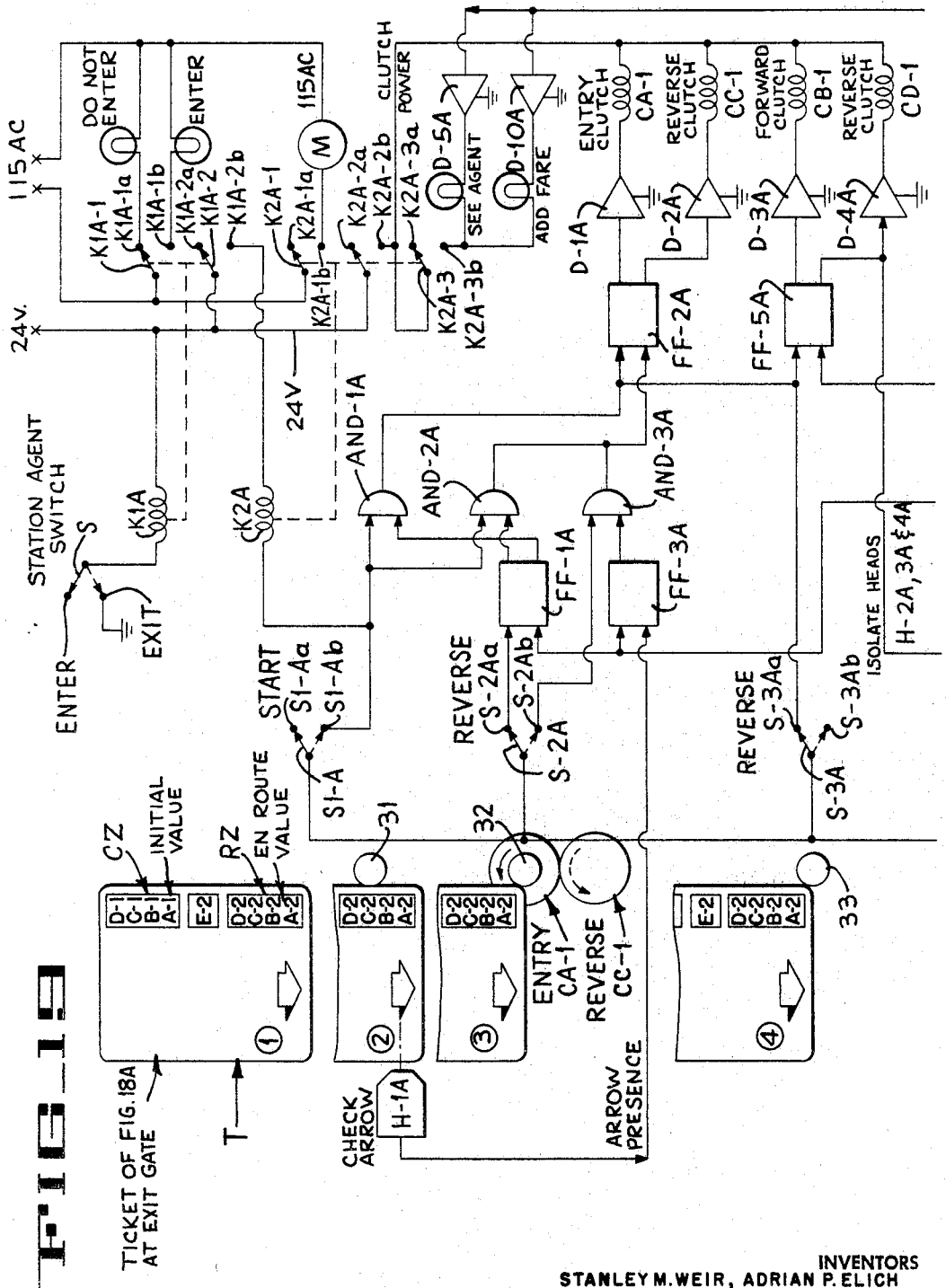

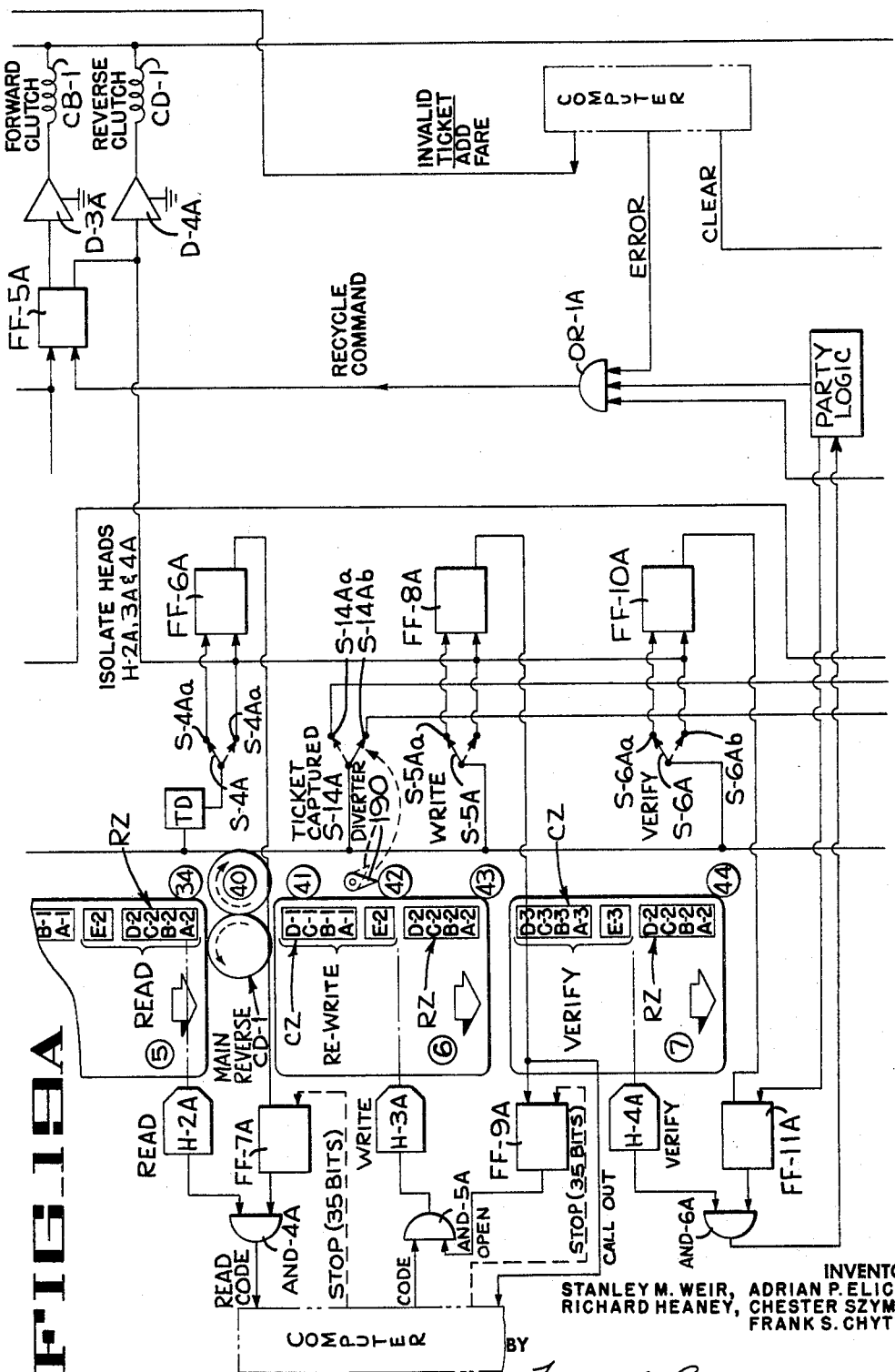

March 17, 1970 S. M. WEIR ET AL 3,501,622
TICKET CREDIT ACCOUNTING SYSTEM
Filed April 5, 1966 19 Sheets-Sheet 19
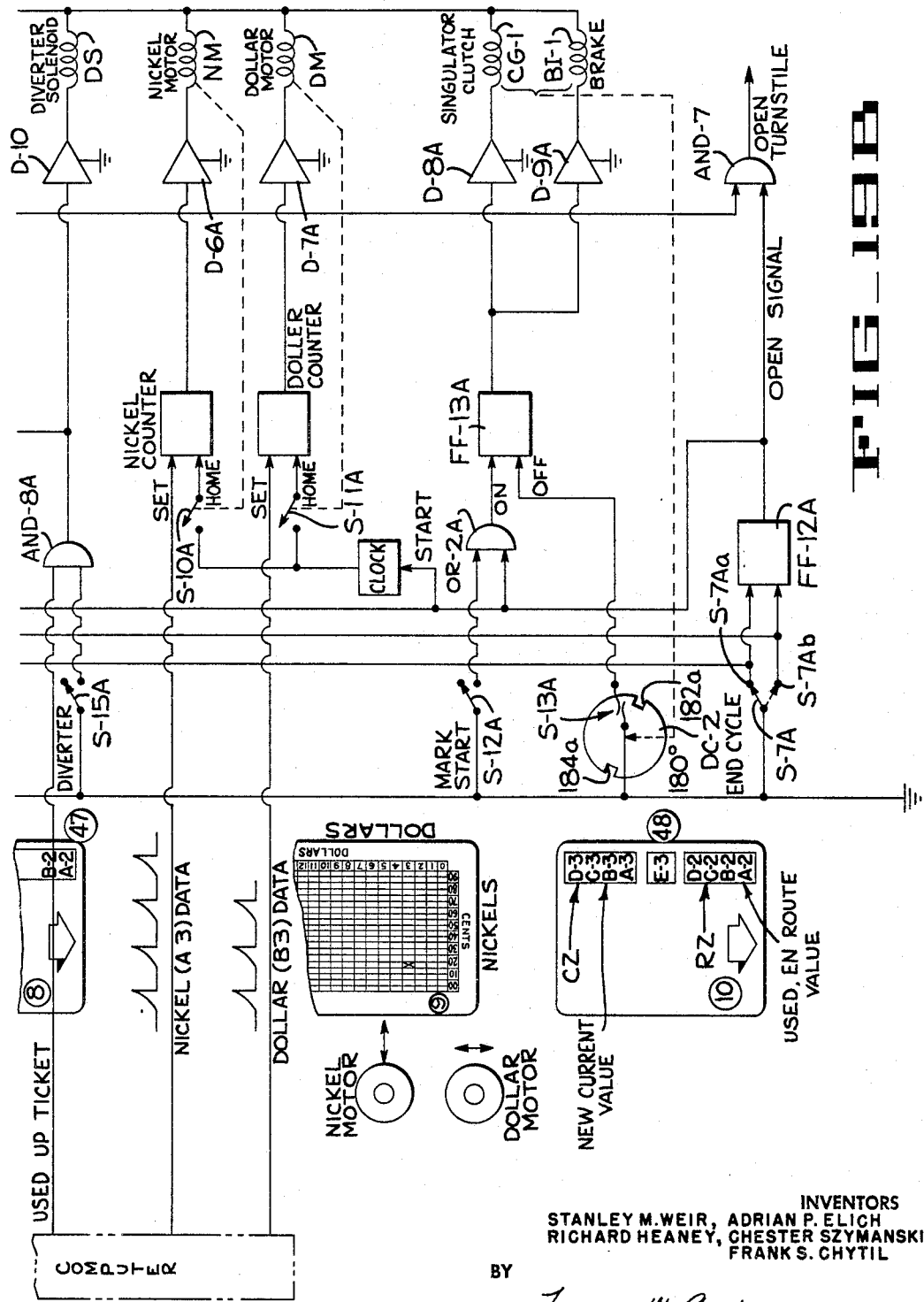
FIG_19B
INVENTORS
STANLEY M. WEIR, ADRIAN P. ELICH
RICHARD HEANEY, CHESTER SZYMANSKI
FRANK S. CHYTIL
BY
Francis W. Anderson ATTORNEY

3,501,622
TICKET CREDIT ACCOUNTING SYSTEM

Stanley M. Weir, Palo Alto, Adrian P. Elich, San Jose, Richard Heaney, Campbell, Chester Szymanski, San Jose, and Frank S. Chytil, Santa Clara, Calif., assignors to FMC Corporation, San Jose, Calif., a corporation of Delaware
Filed Apr. 5, 1966, Ser. No. 540,385
Int. Cl. G06k 7/00
U.S. Cl. 235—61.11                                   4 Claims

ABSTRACT OF THE DISCLOSURE

An automatic fare system wherein the ticket has magnetic code information and human readable coordinate grid information as to ticket value. The entrance and exit gate turnstiles and a central computer automatically account for the fare of each ride. A ticket handling mechanism and a digitally stepped coordinate grid printer are also described.

---

This invention relates to automatic accounting systems and an embodiment will be described as applied to a ticket credit system, (stored value ticket), such as could be used in rapid transit and other public transportation lines. In the description of the invention that follows, the article bearing the transaction value data is in the form of a transportation ticket, and will be so described. This does not mean that the invention is limited to the use of railroad or other transportation tickets. This invention is an improvement over the system of British Patent 857,658 published Jan. 4, 1961, in a manner which will be apparent.

The system of the present invention processes a stored value ticket. That is, indication as to the current cash value of the ticket and other data are contained on the ticket itself, so long as the ticket is valid. The ticket bears both machine-readable and human-readable transaction value data. The machine-readable data are in the form of a magnetic strip having recorded thereon the value of the ticket and other significant data relative to the transportation system such as the station of entry or exit, the time, type of ticket, etc. The human-readable data are in the form of visual marking on a coordinate-grid, which indicate the initial cash value of the ticket in dollars and nickels (cents) and the value of the same ticket after each ride. The marking in of the new, lower value of the ticket on the coordinate-grid does not efface the previous markings so that the ticket holder need not know what the data is on the machine-readable (magnetic strip) portion of the ticket to check the operation of this system and insure that he is getting his money's worth.

Other features and advantages of the system of the present invention employing a ticket of the type described are:

The system can be set up using graduated or zone fares with the cash value of each ride being automatically accounted for (deducted) on the ticket.

Care is taken to avoid erasing of the transaction value data on the magnetic tape unless the system is properly functioning. At the entry gate of a station, the initial machine-readable data including the transaction value of the ticket, is automatically read when the ticket holder inserts it in the ticket receiving portion of the gate. Assuming that a fresh ticket has been purchased, the magnetic strip will bear the initial value in a Current Value Zone. At the entry gate, the initial value and other information pertinent to the station, etc. are re-written in an En Route Value Zone, in a manner that does not destroy the machine-readable recording of the transaction value data initially on the ticket.

The apparatus at the entry gate automatically verifies the aforesaid newly written machine-readable data, and in fact reverifies it, before sending the initial data thus read from one zone and rewritten on the ticket in another zone, to an arithmetic processor such as a central computer.

This is accomplished by providing at least two zones on the magnetic strip for data. In the present example there is a zone for the initial data (current value zone), and a zone for the newly written data (en route value zone), which, if all goes right should be a duplicate of the initial data. Thus, by rewriting (copying down) the initial data without disturbing it, there is no danger of destroying the recorded initial value of the ticket.

Of course, having the transaction value of the ticket visually marked on a coordinate grid assists officials in catching errors in the magnetic strip reading and writing operations, and prevents depriving the ticket holder of the remaining value of his ticket. The apparatus in the entry gate, as mentioned, verifies the new machine written data before sending them to a Parity Logic and to a central computer.

Assuming that all goes well, and that the ticket is initially valid, the ticket holder passes through the entry gate, now holding a ticket containing both the initial and the rewritten transaction value (en route) data on the magnetic strip. These data are on the current value and en route value zones, respectively, as explained.

After leaving the transportation train or the like the ticket holder must pass through an exit gate, using his ticket as a key in order to open the exit turnstile.

At the exit gate, an exit unit reads the transcribed (en route) transaction value on the en route value zone that was written in and verified at the entrance gate, which data will include the station of entry. Parity bit data is also written and read for verification. These data are sent from the exit gate reader to the central computer, which calculates the fare from the entrance to the exit stations and sends the new current value of ticket to the exit gate Write unit. The new current value and other data are written in place of the data initially in the current value zone of the ticket, and verified. If all is well, the computer opens the exit turnstile to the ticket holder. If a ticket does not have stored thereon enough value for the ride, or if there are other errors connected with the ticket, the ticket holder will not be able to use the exit turnstile but will be directed to the Station Agent.

Another important feature of the invention is that a coordinate-grid ticket marking apparatus is automatically operated at the exit gate to mark visually the new cash value of the ticket, that is, the value of the ticket after the fare for the last ride has been subtracted by the central computer. This marker is also automatically controlled by the central computer and shows the latest value of the ticket without having defaced or erased the previous values thereon. This enables the ticket holder to check the operation of the system and assures he does not lose any value due to the automatic equipment. This enables the number of value bits to equal the product of the unit data bits in the control.

Other features of the invention are as follows:

The ticket contains an arrow having a magnetic strip thereon so located that the orientation of the ticket can be checked before it enters the main portions of either the entrance or the exit gates. If the ticket is not properly oriented, it will be automatically returned to the ticket holder.

The entry gate unit is compatible with a coin vendor. This automatically produces a single ride ticket bearing the cash value, corresponding to the coins deposited in the vendor, in the en route value zone of the magnetic strip. This vended ticket is not visually marked. The vended ticket is injected into the flow stream of the entry gate. The ticket is introduced after the Read Head, which is not needed here. However, it enters before the Write Head, so that the value corresponding to the coins deposited in the vendor can be transmitted by the central computer to the Write Head for writing the paid for initial value in the en route value zone, and for verifying the material so written in the manner previously described. At the exit gate, this single ride ticket is captured, but the exit turnstile is opened.

At both the entry and exit gate units, if a second ticket is inserted prematurely into the units before the first ticket has had time to advance far enough for processing, the second ticket will be automatically returned to the second ticket holder.

At both units, if the newly written material after verification is found to contain an error as compared to what appears in the machine-readable material being transcribed, the ticket is recycled for rewriting and reverification. If errors are still present, the computer will cause the ticket to be returned to the ticket holder, will not open the turnstile and will indicate that the ticket holder should see the Station Agent.

At the exit gate, multiple ride tickets having no value remaining, are captured and not returned to the ticket holder. Tickets having less value than the fare are returned and an "ADD FARE" sign is illuminated. The ticket can now be increased in value at an "ADD FARE" vendor until the ride value has been deposited. The revised ticket is now re-inserted in the exit unit.

The machine reading and writing and the human-readable marking system are designed to be extremely rapid in action so that the maximum cycle time is very short, namely in the order of milliseconds. This expedites mass transportation. In the preferred form, the ticket takes a one-way, U-shaped path through the entry and exit units. This facilitates high speed operation.

The manner in which these features and advantages may be attained under the present invention will be apparent to those skilled in the art from the following detailed description of an embodiment of the invention, as it relates to use in a rapid transit or similar public transportation system.

In the drawings:

FIGURE 1 is a perspective view of a number of dual purpose entry-exit gates in the system of the invention.

FIGURE 2 is a diagrammatic plan view showing modes of operation of the gates.

FIGURES 3 and 4 are obverse and reverse views of a ticket.

FIGURE 5 is a schematic block flow diagram of the major ticket processing at the entrance gate.

FIGURE 6 is a similar diagram for the exit gate.

FIGURE 7 is an edge view of the entry unit.

FIGURE 7A is an isolated edge view of the entry drive.

FIGURE 7B is an isolated edge view of a typical pressure roller assembly.

FIGURE 8 is a side view of the entry unit taken on line 8—8 of FIGURE 7 showing the roller S, switches and magnetic heads.

FIGURE 8A is a fragmentary view taken on line 8A—8A of FIGURE 8.

FIGURE 9 is a view taken on line 9—9 of FIGURE 7, showing the drive arrangement.

FIGURE 10 is an enlarged plan view of a ticket singulator (vendor) in the entry gate unit.

FIGURE 11 is a section taken on line 11—11 of FIGURE 10.

FIGURE 12 is an edge view of the exit gate unit.

FIGURE 13 is a view taken on line 13—13 of FIGURE 12 showing the roller arrangement.

FIGURE 14 is a side view taken on line 14—14 of FIGURE 12 showing the drive.

FIGURE 15 is an enlarged side view of a marking unit.

FIGURE 16 is a section taken on lines 16—16 of FIGURE 15.

FIGURE 17 is a perspective view of the marking unit.

FIGURES 18, 18A and 18B cooperate to form a schematic operational and logic circuit diagram of the entry gate unit.

FIGURES 19, 19A and 19B are similar diagrams of the exit gate unit.

GATE ARRANGEMENT

Referring to FIGURES 1 and 2, a four turnstile gate is shown for operation by the system of the invention. Three of the gate units 50 are dual purpose units, operating for both entry and exit. Another unit 50A controls a turnstile only upon entry, and a fifth unit 50B controls a turnstile only on exit. The turnstiles 51 are physically mounted on the three units 50 and the unit 50A. The units 50 each include an entry assembly 52 for controlling the turnstile 51 mounted thereat, and an exit assembly 54 controlling an adjacent turnstile, 2. The entrance unit 52 of the unit 50A controls the turnstile 51 on that unit for entry, whereas the exit unit 54 and the gate unit 50B controls the turnstile 51 in the adjacent gate unit 50.

Each entry unit 52 has a ticket receiving slot 56 and a ticket return slot 58, whereas each entry unit 54 has similar ticket slots 56a, 58a. Each of the entry units 52 has a coin slot 54 for a vendor that issues a ticket. The gate units 50 and 50A have "ENTER" signs 62 which can be illuminated when used as entry gates and "DO NOT ENTER" signs 64 (one shown) can be illuminated when they are used for exit gates. A See Station Agent light 66 is associated with each of the entry and exit units 52 and 54 respectively. An "ADD FARE" light 67 is at each entry unit. An "EXIT" sign is shown at 68 for the turnstile 51 between the gate unit 50B and unit 50. This can be turned on and off by the Station Agent. Similar exit signs (not shown) can be placed at the other turnstiles 51 and controlled for using these as exit turnstiles if desired.

THE TICKET

The obverse or front side of the ticket is shown in FIGURE 3. This side includes instructions and an arrow head indicating how to insert the ticket in the gate slots. One side of the arrow head is magnetized at AH so that if the ticket is inserted reversed end for end or upside-down it will be rejected. A magnetic oxide strip is printed along the left side of the ticket as viewed in FIGURE 3. The magnetic oxide material is of the conventional type such as used in tape recorders and credit cards.

The magnetic strip is broken up into three blocks of magnetic bits but divided into two zones. The entry zone is called Current Value Zone CZ. The exit zone is called En Route Value Zone, RZ. Two of the blocks consist of four words each and the center block consists of one word. The words are shown as A, B, C, D and E.

The word A uses the Nickel value. B is Dollar value. The first part of word C is the type of ticket and the second part is part of the station identification. D is the balance of the station identification. All monetary values on the ticket are shown in five cent increments.

The Type of Ticket word is to be used by the comptroller of the Rapid Transit System for audit purposes, as an example, passenger may be entitled to free rides or a special discount ride.

The Station word together with the portion assigned to Type of Ticket word will handle 28 different station designations. Should more station designations be required by the System another word, "F" would be added to both current zone and en route value zones.

The En Route Value Zone, RZ provides the stored value of the ticket at entrance for later reading and exit. The Current Value Zone, CZ is written at exit and provides the final stored value of the ticket (the en route value with the value of the ride just taken, deducted).

Word E provides the date and security information, first in conjunction with the en route value zone and later with the current value zone. The Date portion of word E designates the portion of the day on which the ride is taken.

This information is important in order to restrict the passenger to a given time interval of travel and serves to prevent unauthorized use of the ticket by those attempting to cheat the graduated fare system. The Security portion of word E is used to set up the proper sequence of entrance, exit, entrance and exit.

In order to set up the proper descriptive sequence it will be assumed that the ticket has been purchased from a ticket vending machine. The ticket vendor will write words A, B, C, D and E in the Current Value Zone, CZ portion of the magnetic strip. In this case word E will provide information indicating the date of purchase and and security information indicating that the ticket was purchased from a ticket vending machine. Words A and B will provide the initial stored value of the ticket plus a predetermined bonus obtained from the computer. The word C will indicate that the ticket purchased from the vending machine is a multiple ride ticket. The balance of word C and all of word D will indicate the station location of the ticket vending machine. During a later description these particular words will have a suffix—1 added to the word letter, such as E–1. Information in the En Route Value Zone, RZ portion of the magnetic strip is missing from a fresh ticket which was just purchased from a ticket vending machine.

The reverse or rear side of the ticket is printed in grid-coordinate form to indicate the cash value of the ticket in dollars and nickels (cents). The position of the lowest and leftmost mark in the grid indicates the value of the ticket as explained in the instructions on the front side. For example, in FIGURE 4, three marks appear on the ticket. The upper righthand margin indicates an initial (purchase) value of $20.00. This mark is applied by the ticket vending machine, not shown. The mark farthest to the left will have been the last mark applied in this case, which indicates a value of $18.10 and thus will be the remaining value of the ticket. An intermediate mark showing a value of $19.75 indicates the previous value of the ticket, that is, the value before the last ride. In the example given, the first ride of $20.00 to $19.75 represents a fare of 25¢, whereas the second ride from $19.75 to $18.10 represents a fare of $1.65. The marks following the initial, $20.00 mark are all applied by the marker in the exit unit 54.

By using marks on a coordinate grid as shown, printing type mechanism is not required and stepping motors operated by successive bits of information can move a single universal marker (e.g. X) along the coordinates of the grid to any desired zone, all under single two channel remote control of the computer.

The ticket itself is laminated so that it prints through upon pressure from the marker in the manner described and claimed in the copending continuation application of Richard Heaney et al., Ser. No. 649,084, filed June 22, 1967, and assigned to the assignee of the present invention.

Thus, it can be seen that the ticket bears both machine-readable and human-readable data and that the human-readable data is on a coordinate-grid which indictes the present value of the ticket without requiring other than a single mark at a selected proportion of the grid. This lends itself to simple digital remote control of the marker from a central computer to give the human-readable ticket value data, which encompasses about 440 different values.

FIGURES 5 and 6 are basic block flow diagram showing the fundamental steps in ticket processing at the entry and exit gates. These diagrams are self-explanatory.

THE ENTRY GATE UNIT

As mentioned, major functions of the entry gate unit are: (1) to read the current value of the ticket (A, B) and its type (C) in the current value zone CZ and to transfer this information to the en route value zone RZ for processing at the exit gate. This makes possible checking the system's operation.

(2) The information in zone E relative to the time of day and parity bit data are also read and rewritten.

(3) The station of entry (D) is identified. The information A, B, C, and D is verified through a parity bit logic circuit, and the ticket may be recycled for a second reading and writing operation before the ticket is either finally accepted or rejected. The entry gate unit 52 also has means for vending a ticket directly by a coin control apparatus.

The mechanical construction of a vending gate unit 52 embodying the invention as shown in FIGURES 7 through 11, to which reference is now made. Within the housing of the gate unit, is a base plate 70 from which supports a standard plate 72 that mounts the ticket transport rollers, clutches, etc. for the unit. The drive mechanism for a Ticket T inserted through the receiving slot 56 is in the form of a series of rubber covered rollers spaced by less than one ticket length. Each drive roller faces an idler that is spring pressed against the ticket and in the description that follows the idler rollers are given the subscript *a* but otherwise bear the same reference character as do the adjacent drive rollers.

There are two driven entry rollers, 1 and 2, and these are controlled by an entry clutch CA and an entry reverse clutch CC. The purpose of the separate entry drive is to return the ticket in case it has been incorrectly inserted (arrow head misplaced) or to return a second ticket that follows a first ticket which has not proceeded far enough through the unit to be properly processed.

Following the entry rollers 1 and 2 is a series of main drive rollers 3–16 and their idlers. This series of rollers is controlled by a main forward clutch CB and a main reverse clutch CD, these clutches serving to recycle the ticket if the verification operation indicates lack of parity, or if so ordered by the computer. The opposed faces of the tickets are guided between the rollers by opposed pairs of plates 74, 74a and 76, 76a (FIGURES 7 and 8). The inside edge of the ticket rides along a face plate 75 (FIGURE 7).

The rollers and other elements which advance and reverse the ticket are all driven by belts and pulleys from the drive motor M which, by means of a belt 77 (FIGURES 8 and 10) drives a main jackshaft 78. This shaft, through a belt 80, drives one element 82 of the main clutch CB (FIGURE 7). Another belt 84 driven by the main jackshaft 78, drives one element 86 of the main reverse clutch CD (FIGURE 7). The element 82 of the main clutch CB, through a belt 88, drives a multiple pulley 90. This pulley, through a belt 92, drives one element 94 of an entry forward clutch CA. The entry reverse clutch CC is also driven from the multiple pulley 90 by a belt 96, which drives one element 98 of the clutch.

As seen in FIGURE 7A, the second entry roller 2 is driven directly by the other (internal) element 94a with a clutch CA and the entry roller 1 is driven from a roller 2 by a belt 99 (FIGURE 9). As to the reverse clutch CC, its other element 98a (FIGURE 7A) is coupled to a gear 100 which drives a gear 101 on a shaft of the entry roller 2. The actions of the clutches CA and CC are such that when the clutch CA is energized under remote control, the entry rollers 1 and 2 are driven to advance the ticket through the apparatus. When the clutch CA is deenergized and the reverse clutch CA is energized, the gear 101 which turns in the same direction as the direction of rotation of the forward clutch CA. This imparts reverse rotation to the entry roller 2 because of its mesh with the gear 101a, thereby returning the ticket to the ticket holder.

The main rollers 3–16 are driven in the forward direction to advance the ticket through the apparatus by the main clutch CB. When this clutch is energized, its one (external) element 82 is coupled to its other (internal) element 82a (FIGURE 7). This causes the main drive roller 10 to turn in a forward direction. This forward rotation of the element 82a of the main clutch CB drives the other main drive rollers forward by a series of belts and pulleys, the belts being indicated at 102–26 in FIGURES 7 and 9, the details of this drive not being critical to the invention.

In order to reverse the main rollers 3–16, the main reverse clutch CD has its element 86 driven in what would normally be the forward direction. However, the other (internal) element 86a of the main reverse clutch CD (FIGURE 7), does not drive a ticket roller, but drives a gear 130 (FIGURES 7 to 9) and this gear is meshed with a gear 132 pinned to the shaft for the main drive roller 11. Thus energization of the main reverse clutch CD reverses the direction of the main rollers 3–16, and causes the ticket to travel backward through the apparatus.

The entry gate unit 52 also includes a coin operated ticket vendor, which includes a ticket supply and singulator apparatus for introducing the tickets into the flow stream of the units. The vended ticket is introduced in the flow stream between rollers 9 and 10, which is Head H–2, but before the position of the Write Head H–3. Thus the vended value can be written on the magnetic strip.

The ticket singulator includes the pair of ticket stackers 140, 140A and a singulator and delivery belt 146 that runs beneath them. A double acting shuffle feeder plate 148 (FIGURES 10 and 11) reciprocates beneath the stackers 140, 140A and alternately pushes the bottom ticket T from each stack onto the belt 146. In FIGURE 11, a singulated Ticket T is shown on the belt and beneath a sensor roller 147. The sensor roller 147 operates a Switch S–8 (FIGURE 8) which may be used to control the ticket dispensing operation by indicating its condition. This circuit is not critical to the invention and is not shown.

The double acting feeder plate 148 is reciprocated by a link 149 (FIGURES 10 and 11) connected to a bell crank 150 pivoted on the plate 70. The bell crank is oscillated by another link 152 (FIGURES 8 and 10), pinned to a crank pulley 154 (FIGURES 7 and 8).

The singulator mechanism is driven from the main jackshaft 78 (FIGURES 7 and 9) through a belt 158, which drives one element 160 of a singulator clutch CE. The other element 160a of the clutch drives a pulley 162 and a belt 164, which drives the crank pulley 154 for the shuffle plate as just described.

After leaving the singulator belt 146, the ticket is advanced into the main stream by driven vendor rollers 21–28. The rollers 21–28 and the singulator belt rollers 18 and 20 are all driven together and in the same direction. This roller drive is also from the main jackshaft 78 a belt 170 driven therefrom (FIGURES 7 and 9), which belts drive one element 172 of a vendor clutch CF. The other element 172a of this clutch drives a ticket drive roller 27 for advancing the ticket into the main stream, between rollers 9 and 10 (see FIGS. 18A and 18B). The various drive rollers 20 to 28 are all driven by belt and pulley combinations, including belts 174–178 indicated in FIGURES 7 and 9.

The position of the various magnetic heads and control switches will now be briefly explained, particularly with reference to FIGURE 8. Progressing in the order of ticket advancement, a Ticket T inserted in the slot 56 first closes the Start Switch S–1. The ticket next advances under the Read Arrow Head H–1 and then shifts a reverse Switch S–2. This and other "read" heads to be described are of the conventional air gap magnet type used as "playback" heads in tape recorders and card readers. Read heads do not erase the magnetic information being read.

The ticket then, in order, operates a Reverse Switch S–3, the Read (code) Head H–2, the Read Switch S–4 (through idler roller 4a) and a Write Switch S–5. The ticket passes the Write Head H–3, operates a Verify Switch S–6 and immediately passes under the Verify Head H–4. The ticket proceeds on past the end of Cycle Switch S–7, as it leaves the unit. This and other write heads are of the conventional "record" type used in tape recorders, etc. Such heads erase magnetic information previously on the tape and substitute the new information. The Verify Head is a read head and does not erase, it is of the "playback" type used in tape recorders.

The singulator is started by a coin and is stopped by a Read Switch S–9, when the latter is closed by a magnet 180 (FIG. 8A). The coins and Coin Start Switches CS–1 and CS–2 energizes the Singulator Clutch CE and start ticket singulator. A Switch Opening Disc DC–1 turns with the crank pulley 154 and is provided with windows 182, 184 for exposing the Read Switch S–9 directly to the magnet. This closes S–9. When the singulator is at rest, the disc DC–1 blanks out the magnet. Once it has started, DC–1 turns until the next window (184) passes the magnet, whereupon S–9 closes and deenergizes the Singulator Clutch CE and sets Brake BI. Before it stops, disc DC–1 coasts and the window 184 passes the magnet 180. Switch S–9 now opens, ready for another 180 degree cycle, involving the window 182.

As mentioned, the ticket singulator portion of the apparatus operation is initiated by a Dual Start Switch, CS–1, CS–2 controlled by the Coin validator, as will be explained presently. After leaving the singulator, the ticket is carried past a Magnetic Arrow Head H–5, which magnetizes one side of the arrow head at AH to provide for checking orientation of the ticket during subsequent uses thereof.

Power Entry Gate operation

Reference is made to FIGURES 18A and 18B. First the gate mode for entrance is set up. This is done with the Station Agent Switch S. Relay K1 is energized and thus enables Contact K1–1b to close and light up the "ENTER" display at the front of the gate. Also, Contact K1–2b is closed and applies power to Relay K2. Contact K1–2b is an able contact for Relay K2. Relay K2 is an instantaneous close, timed release relay. The delay is adjustable to two minutes. The purpose of Relay K2 is to de-energize the entire gate electrical system after a delay of two minutes in order to prevent continuous flow of current through the various portions of the system when the gate actually is not in use.

Normal operation

All flip-flops in the logic circuits are conventional bistable and are assumed to be initially in the reset position.

In ticket position 1 (the position numbers are circled) the leading edge of the ticket closes the Start Switch Contact S–1b which energizes Relay K2. Contact K2–1b closes and the 115 volt ticket transport drive Motor M rotates. This sets up the mechanical transport enable condition for the various clutches. Contact K2–2b closes and supplies 24 volt power to all the clutches. Contact K2–3b closes and provides power to the See Agent display at the top of the gate. Operation of this display will be described later.

Since the Flip-Flop FF–1 is in the reset position, gate AND–1 is open and gate AND–2 is closed. The start pulse emanating from the entry edge of the ticket passes through gate AND–1 and sets FF–2 and FF–5.

FF–2 in the set position energizes the Entry Clutch CA and FF–5 in the set position energizes the main Forward Clutch CB. Energization of the Clutch CA causes the rubber rollers 1 and 2 to pull the ticket forward.

The magnetic portion of the Arrow AH is read by Check Arrow Head H–1 in ticket position 2. The pulse from the head H-1 sets FF-3. FF-3 in the set position closes gate AND-3.

In ticket position 3, Contact S-2b is closed permitting a pulse to gate AND-3 but since FF-3 has AND-3 closed, no signal results. Also, at position 3, S-2a opens which sets FF-1 and in turn closes gate AND-1 and opens gate AND-2.

In the event magnetic area AH is not properly presented, the Check Arrow Head H-1 does not give a signal, FF-3 remains reset, and gate AND-3 opens permitting a pulse from ticket position 3 to pass through to FF-2. Resetting FF-2 energizes the Entry Reverse Clutch CC and the ticket is returned to the passenger.

In ticket position 4, S-3a opens and gives a set pulse to FF-5, but since FF-5 was previously set, nothing changes and the ticket continues to move forward. Until ticket position 5 is reached, all words which might be read by the Read Code Head H-2 cannot reach the computer because the gate AND-4 is closed.

In ticket position 5, Switch S-4b closes, which sets pulse maker FF-6, which in turn sets FF-7. FF-7 opens gate AND-4 and permits words E-1, A-1, B-1, C-1 and D-1 to enter the computer from the read head. After word D-1 has been transmitted to the computer, the computer will automatically reset FF-7, which in turn closes gate AND-4. Any further word information, including ticket noise, cannot be transmitted to the computer.

Information has now been taken from the ticket and transmitted to the computer. Now the computer performs certain operations on the information transmitted to it and in turn transmits new information to the ticket.

In ticket position 6, switch S-5b is closed which sets FF-8 and which in turn sets FF-9 and opens gate AND-5, permitting new code information to pass from the computer to the Write Head H-3. H-3 writes new code information on the magnetic strip starting with the lower block. The lower block now has written on it words A-2, B-2, C-2, D-2 and E-2. Word E-1 is replaced by E-2. In the top block words A-1, B-1, C-1 and D-1 remain unchanged, because at the end of word E-2 the computer automatically resets FF-9, which closes gate AND-5 so that no further code information can be transmitted to the Write Head H-3.

In ticket position 7, S-6b closes which sets FF-10 and which in turn sets FF-11 and opens gate AND-6. This permits verified code information from the Verify Head H-4 to be transmitted to parity logic. Code information A-2, B-2, C-2, D-2 and E-2 is read by the head H-4 and checked for parity. At the end of word E-2, parity logic resets FF-11 which closes AND-6 so that no further words can be transmitted by the Verify Head H-4. If no parity error has been detected, no further circuit change is made. Gate AND-7 is in the open position since it is assumed that every word is correctly written and the computer has transmitted a "clear" signal.

In ticket position 8, S-7b closes setting FF-12 and since gate AND-7 is open, the turnstile is permitted to rotate. Also in ticket position 8, FF-1 and FF-3 are reset.

Double entry reject (Clutch CC)

It will be assumed that there is a ticket located somewhere between position 4 and position 8. Under these conditions FF-1 is in the set position.

In the FF-1 set position, gate AND-1 is closed and gate AND-2 is open. Now it will be assumed that a second ticket is inserted in position 1. The second ticket in position 1 closes S-1b. However, since gate AND-1 is closed and gate AND-2 is open, the pulse resets FF-2 and energizes Reverse Clutch CC. Since Entry Clutch CA and Reverse Clutch CC control only the first two entrance rollers 1 and 2, the ticket in this particular instance immediately reverses and is returned to the passenger. Since gate AND-1 is closed, no signal from ticket position 1 has been transmitted to FF-5. Therefore, there is no change in the operation of Forward Clutch CB and the first ticket continues in its forward motion.

Recycle command-ticket cleared

In the event an error has been detected by parity logic or the computer, Gate OR-1 sends a reset signal to FF-5 which in turn energizes Reverse Clutch CD and deenergizes Forward Clutch CB. Ticket travel direction is reversed to ticket position 4. During the ticket travel to position 4, FF-5 isolates the Write, Read and Verify Heads H-2, 3, and 4 by inhibiting set pulses to FF-6, FF-8 and FF-10. Since FF-6, FF-8 and FF-10 are inhibited from setting and therefore cannot originate start pulses, FF-7, FF-9 and FF-11 remain in the reset position and gates AND-4, AND-5 and AND-6 are closed. This operation inhibits any information coming from or going to the heads H-2, H-3 and H-4.

When ticket position 4 is reached, S-3a opens. This sets FF-5 and in turn deenergizes Reverse Clutch CD and energizes Forward Clutch CB. The ticket once again moves forward and the normal cycle is resumed. It will be assumed that the second pass clears the ticket.

Recycle command-ticket bad

In the event the ticket moves forward and has not been cleared the second time, the computer will transmit an "invalid ticket" signal to the Driver Amplifier D-5 and light "See Agent" through K2-3b. Also the computer does not transmit a "clear" signal to open gate AND-7 and the turnstile remains closed, once the ticket has reached ticket position 8. The ticket continues on from ticket position 8 out the slot and is returned to the passenger.

TICKET VENDING OPERATION

Reference is now made to FIGURE 18 and to FIGURE 18B which replaces FIGURE 18A. When a coin or coins are inserted into the slot 60 (FIGS. 1 and 2) in the gate, Coin Start Switches CS-1 and CS-2 are closed.

When Coin Start Switch CS-1 closes, K2 is energized which in turn closes K2-1b, K2-2b and K2-3b. The normal ticket roller system operation is therefore initiated.

Coin Start Switch CS-2 also closes, setting FF-13 and energizing the Vend Clutch CF. This permits a ticket to be transported to ticket position 9, shown at the bottom of FIGURE 18B for convenience. In ticket position 9, the Magnetize Arrow H-5 magnetizes the ticket arrow at AH. The ticket continues its travel and enters the main stream between rollers 9 and 10 in the normal ticket roller path. The point of entry is between Read and Write Heads H-2 and H-3.

The computer previously received a coin signal when Coin Start Switch CS-2 closed. At ticket position 6A, information will be written on the ticket in sequence A-2, B-2, C-2, D-2 and E-2 by the Write Head H-3. The normal writing and verifying position 7A proceeds from here.

At ticket position 8A, the end of Cycle Switch S-7a will reset FF-13 which deenergizes clutch CF. S-7b also sets FF-14 which energizes the singulator brake BI and the Singulator Clutch, CE. Singulator Clutch CE causes a ticket to be singulated on to the belt 146 (FIG. 8). It also is mechanically connected to a switch Control Disc DC-1 which rotates in synchronism. As mentioned, DC-1 is a disc of magnetic material which acts as a magnetic short circuit to the magnet 180. When one of the two windows 182, 184 in DC-1 is opposite the switch magnet, the read Switch S-9 closes, which resets FF-14 and deenergizes Singulator Brake BI and the Singulator Clutch CE.

The ticket passes through position 8 and is returned to the passenger.

EXIT GATE

The mechanical construction of the exit gate 54 will now be described. As mentioned, the primary function of the exit gate is to read the en route value of the ticket in zone RZ, so that this information (which includes the station of entry) can be sent to the computer. The computer is set up in the transmission lines to be informed of the station of exit so that it can compute the fare and transmit the new current value of the ticket to a Write Head, in order that this information can be rewritten in the current Value Zone CZ.

The exit gate includes means for reversing prematurely inserted second tickets, arrow head (orientation) checking, vertification and recycling elements like those of the entry head, so that these elements need not be described in detail. Also, the entry and main drive and clutch arrangements for the ticket transport rollers are quite similar to those of the entry gate and hence will be mentioned only briefly. As will be seen, however, due to the fact that the Read and Write Heads in the exit unit are operating on different zones from those on the entry unit, their physical positioning is somewhat different from that of the entry unit, as will also be explained presently.

The exit unit 54 includes the coordinate-grid (FIG. 5) marker which provides human-readable information as to the new current value of the ticket without erasing the previous (en route) information as to its value. The exit unit also includes provision for capturing the ticket when its value has been depleted so that it is not returned to the passenger. If, at the exit unit, a ticket is inserted which has some remaining, but inadequate fare, the exit unit returns the ticket ot the passenger and directs him to the station agent or to add fare in a fare adding machine, which is not critical to the present invention and is not illustrated.

The mechanical construction of the exit gate 54 is shown in FIGURES 12 to 14. As mentioned, many of the elements of the exit gate have their functional counter parts in the entrance gate and hence need only be mentioned. The exit gate has a pair of entry rollers 31, 32 and associated idlers, which correspond to the entry rollers 1, 2 of the entry gate. The exit gate also has a series of main ticket advance rollers 33–48, corresponding to the main rollers 3 to 16 of the entry gate. These rollers have idlers as previously described, given the suffix "a." The rollers are mounted between plates and the ticket has a guide plate for one edge as described in connection with the entry gate.

The exit gate has entry Clutches CA–1, CC–1 and main Clutches CB–1, CD–1 driven from a Motor M–1. These clutches are functionally like those of the entry gate having the same reference characters without the suffix "1." The exit gate has magnetic heads H–1A to H–4A corresponding to Heads H–1 to H–4 of the entry gate, except that these heads are positioned to operate on different portions of the ticket, as illustrated in the diagram of FIGURES 5 and 6. The same remarks apply to the Switches S–1A to S–7A of the exit unit.

The entry, initial ticket reverse, main ticket transport, ticket reverse for recycling and the reading, writing and vertifying operations of the exit gate are substantially like those of the entry gate and these elements will not be described in detail. The operation of all elements that are not explained in the mechanical description of the entry gate that immediately follows, will be explained in a subsequent operational description of the entry gate.

Ticket capture

Under certain conditions, to be explained in detail presently, tickets inserted into the exit gate are "captured," i.e. they are not returned to the passenger but are diverted into a receptacle within the apparatus. In order to accomplish this, a diverter arm 190 (FIGURES 13 and 14) is pivotally mounted between the roller plates and projects from its pivot in the direction of ticket travel when the ticket is being advanced forwardly. The arm 190 is swung by a Diverter Solenoid DS which pivots the diverter arm to the left, as viewed in FIGURE 13, thereby causing the ticket, when moving in reverse or back toward the main path so that it is not reutrned to the passenger. The Diverter Solenoid DS is controlled by a diverter solenoid Switch S–15A, disposed between the diverter arm 190 and the exit Switch S–7A. Thus it can be seen that if a ticket is reversed after it has moved forwardly past the diverter Switch S–15A, thereby causing the ticket to move backward through the machine, the ticket, when it reaches the diverter arm 190, will be removed from the main stream, that is, it will be captured.

A ticket thus captured passes between ticket capture rollers 49, 49a and the latter operating a "ticket capture" Switch S–14a, for reasons to be explained in the operational description. The captured ticket then passes between a pair of geared chopper rolls 192, 194 which are driven by a belt 196 from the pulley driving the roller 49. The pulley 49 is driven by a belt 147 from a pulley on the shaft of the roller 42 in the main stream. The captured and chopped ticket is deposited in a bin 198.

Marker

A marker P is mounted just upstream of the end of cycle or exit Switch S–7A, so that tickets passing through the marker have their new current value marked on the coordinate grid thereof before the cycle ends. The construction of the marker appears in FIGURES 15 to 17. The marker is mounted on a base plate 200 which is supported by spacers 202 on the main plate 72a of the exit unit. A marker drum sleeve 206 is rotatably mounted in plates 72a and 200. A marker drum 208 is pinned to the sleeve 206. A Dollar setting gear 210 is pinned on the sleeve 206, for rotating the marker drum in accordance with instructions from the computer, via a Dollar motor. This gear also serves (indirectly) for rotating the drum in order to mark the ticket.

A punch slot 212 is povided in the drum 208 and a punch mounting rod 214 slides in the sleeve 206. A coordinate-grid punch 216 is mounted on the rod 214 and projects through the slot 212 in the drum. The punch 216 is carefully positioned (axially) to provide proper indentation pressure. In the mounting shown, if adjustment is desired, the end of the punch may be ground off to decrease, or shimmed out to increase the indentation force, although this is a detail not critical to the present invention.

The punch 216 is set along the slot 212, which represents the nickel axis of the coordinate-grid. As seen in FIGURE 16, a motor mounting bracket 218 projects from the plate 200 and mounts the Nickel Motor NM so that its axis is normal ot the axis of sleeve 216. A nickel motor rack 220 slides in the sleeve 206 and is reciprocated by a pinion 222 on the nickel motor. A swivel joint 224 connects the rack with the rod 214, to permit the rod to rotate with the drum during the dollar setting and ticket marketing operations. Thus, it can be seen that rotation of the nickel motor pinion through a predetermined number of arc increments can position the punch 216 at any desired position along its path on the nickel axis of the coordinate-grid of the ticket.

Dollar set drive

The Dollar Motor DM (FIGURE 17) is also mounted on the plate 200, but with its axis parallel to (but offset from) the drum mounting sleeve 206. The dollar motor has a pinion 226 which meshes with a dollar setting pinion 228, the latter being meshed with the large dollar setting gear 210 pinned to the drum sleeve 206. Thus, it can be seen that rotation of the dollar motor is imparted, through the gearing just described, to the drum 208 that carries the punch, thus causing motion of the punch along (around) the dollar axis of the coordinate-grid on the ticket.

Mark unit

The means for rotating the drum 208 in order to mark the ticket after the punch has been set, is associated with the dollar setting means in the sense that it rotates the drum through some or the mechanism involved in the dollar setting means. However, the principle of the operation is that the marking drive is always through a fixed (180 degree) stroke, and the effectiveness of this stroke, insofar as marking the ticket is concerned, is determined by the position of the punch as set by the dollar motor. This results in the punch mark occurring at the preselected dollar coordinate on the ticket grid. In the form of the invention shown, the marker drum 208 is rotated a half turn in one direction when the marker Clutch CG (FIGURES 12 and 13) is energized by the ticket before it reaches the marking position, and the marker drum is turned back 180 degrees to its initial position by the same clutch and drive mechanism when the ticket passes through the exit, or end cycle Switch S–7A.

Referring to FIGURES 12 to 17, FIGURES 12–14 showing the overall arrangement and FIGURES 15–17 showing the marker assembly on an enlarged scale, the belt 230 from the jackshaft 78a drives the marker Clutch CG. The inner element of the brake BI–1 and to a pulley 233 (FIGURE 12). A belt 234 is driven by pulley 233 and drives a crank pulley 236. A link 238 connects at one end to the crank pulley 236 and at the other end to a sector gear 240. Rotation of the crank pulley 180 degrees turns the sector gear 240 through an arc of 90 degrees. A marker idle gear 242 (FIGURES 15 and 17) meshes with the sector gear and with a mark drum drive gear 244, the latter rotating freely on the sleeve 206.

A mark drive crank plate 246 is pinned to the gear 244 and this is the member that actually mounts the shaft for the dollar setting pinion 228 previously described. A mark drive lock-up latch lever 250 (FIGURE 15) is pivoted at 254 to the crank plate 246. A spring 254 connects between the latch lever 250, having teeth 251) and a spring post on the plate 246. This spring urges the mark lock-up lever 250 towards the Dollar setting pinion 228, so that in order to bring latch teeth on the lever into engagement with the pinion, as best seen in FIGURE 15. A stop pin 256 projects from the marker unit mounting plate 200 (FIGURE 17) this pin also appearing behind the spring 254 in FIGURE 15. Before the marking operation begins, the crank plate 246 will have returned to a position which brings the marked drive lock-up latch lever 250 against the stop pin 256 causing the latch teeth 251 on the lever to clear the Dollar setting pinion 228, as seen in FIGURE 15. In the position shown in FIGURE 15, it can be seen that the Dollar setting pinion is free to rotate insofar as the lever 250 is concerned.

During the mark drive operation, the Dollar motor pinion is latched, in order to preserve its home setting. This is accomplished by a Dollar motor pinion latch lever 260 having teeth 261 and pivoted at 262 on the main marker plate 200. The lever teeth 261 (shown in dotted lines in FIGURE 15) are provided for engaging the Dollar motor pinion 226. A mounting bracket 264 is also mounted on the plate 200 for mounting a Mark Home Switch S–11A, as seen in FIGURE 15. A pin 268 on the crank plate 246 is provided for causing the teeth 261 on the latch lever 260 to clear the Dollar motor pinion 226 when the crank plate 246 is in the Mark Home position. Thus, as seen in FIGURE 15, both the Dollar motor pinion 226 and the Dollar setting pinion 228 are cleared by their respective latches 260, 250 at the beginning of the cycle with their elements in the home position.

When the marker Clutch CG (FIGURES 13 and 14) is energized by the Mark Start Switch S–12A, the crank pulley 236 is given a half revolution by the control circuit Disc DC–2, as will be described presently in more detail. This operation takes place as the ticket passes the Switch S–12A.

The sector gear 240 is given a quarter turn which turns the marking idler pinion 242 and the mark drive gear 244 a half turn. This rotates the drum 208 a half turn and marks the ticket during the process. Rotation of the drum 208 is actually affected by the latch mechanism, the Dollar motor setting pinion 228 and the Dollar setting gear 210. This operation takes place because as soon as the mark drive gear 244 is rotated, it carries the mark clamp plate 246 with it. This, in turn, moves the mark lock-up latch lever 250 so as to cause it to clear the stop pin 256 mounted on the plate 200. Before the stop pin 256 is cleared, the Dollar setting pinion 228 moves toward the latch lever and after these teeth 251 on the latch lever and after these teeth are engaged, the pinion 228 is locked against rotation. Further motion of the mark drive gear 244 and its plate 246 carries the pinion 228 (which is now locked against rotation by the latch) with the plate 246. Since the pinion 228 is meshed with the Dollar setting gear 210, the Dollar setting gear rotates with the mark drive gear 244. The Dollar setting pinion 228 is simultaneously disengaged from the Dollar motor pinion 226. Initial motion of the plate 246 moves the stop pin 268 on that plate away from the Dollar motor pinion latch lever 260, so that the spring 266 brings the teeth 261 on the latch lever into mesh with the teeth on the Dollar motor pinion 256. This locks the Dollar motor pinion against rotation in its home position.

The marking drum is thus rotated 180 degrees under control of the switch DC–2 and associated elements and it is rotated back 180 degrees when the ticket passes the end of cycle Switch S–7A under control of DC–2. Rotation of the drum motor back to its home position operates the home Switch S–11A, the function of which will be explained in detail in the description of the circuit that follows. During the marking operation, the punch 216, which has been set by the Nickel and Dollar motors will mark the coordinate-grid on the ticket, the latter being backed up by the back-up drum 270 as best seen in FIGURE 16. The ticket strikes a stop 271 on drum 270 for accurate registration with marker 216 (FIG. 15).

The electrically operated clutches described are of conventional design, the details not being critical to the present invention. Suitable clutches are made by the Simplatrol Products Corporation of Worcester, Mass., Model No. FFC–53. The Brakes BI and BI–1 associated with Clutches CD and CE are likewise conventional and a suitable brake is manufactured by the above company, Part No. 063–1580–001–B.

The Nickel and Dollar stepping motors details are likewise not critical to the invention. Suitable motors are manufactured by the IMC Magnetics Corporation of Maywood, Calif., Part No. 020–010. The controllers or counters referred to for these motors are likewise of conventional design and suitable units are manufactured by the above company, Part No. 0128–50–3312–01.

The coin box for initiating operation of the ticket vendor in the entry unit is likewise conventional design and the details are not critical. A suitable device is manufactured by the Coin Acceptor Inc. of St. Louis, Mo., Model A–1510–815.

EXIT GATE OPERATION

FIGURES 19, 19A and 19B are diagrams illustrating the exit gate operation and electrical circuits.

The function of relays K1–A and K2–A is identical to that of K1 and K2 for the entry gate, namely to set up the power supplies.

The ticket, with magnetic en route value information written on the magnetized strip in Zone RZ, after leaving ticket position 8 of the entry gate, and after the ride, is now inserted into ticket position 1 of the Exit Gate at the exit station. The operation of the switches and associated circuitry for S–1A, S–2A, S–3A, S–4A, S–5A and S–6A is substantially identical to that of switches in the entry gate S–1, S–2, S–3, S–4, S–5 and S–6, except that the head, write and verify heads are so positioned and so controlled by their switches that they function as shown in the diagram of FIGURE 6.

In ticket position 5, Read Switch Contact S–4A*b* is closed. This sets FF–6A, which in turn sets FF–7A. FF–7A opens AND–4A and permits words A–2, B–2, C–2, D–2 and E–2 to enter the computer from the Read Head H–2A. After word E–2 has been transmitted to the computer, the computer will automatically reset FF–7A, which in turn closes gate AND–4A. Any further information including ticket noise cannot be transmitted to the computer.

En route value and parity bit information has been taken from the ticket and transmitted to the computer. Now the computer performs certain operations on the information transmitted to it and in turn transmits new information to the ticket.

In ticket position 6, Write Switch contact S–5A6 is closed, which sets FF–8A and which in turn sets FF–9A and opens gate AND–5A, permitting new code information to pass from the computer to the Write Head H–3A. H–3A writes new code information on the magnetic strip starting with the lower block RZ. The lower block will now have written on it words E–3, A–3, B–3, C–3 and D–3. Word E–2 is replaced by E–3. In the bottom block RZ, the en route value words A–2, B–2, C–2 and D–2 remain unchanged. After reading word D–3, the computer resets FF–9A which closes gate AND–5A so that no further code information can be transmitted to the Write Head H–3A.

In ticket position 7, Verify Switch Contact S–6A*b* closes, which sets FF–10A and which in turn sets FF–11A and opens gate AND–6A. This permits verified code information from the Verify Head H–4A to be transmitted to Parity Logic. Code Information E–3, A–3, C–3 and D–3 is read by the Verify Head H–4A and checked for parity. At the end of word D–3, parity logic resets FF–11A which closes gate AND–6A, so that no further words can be transmitted to the Verify Head H–4A. If no parity error has been detected, no further circuit changes are made. Gate AND–7A is in the open position, since it is assumed that every word is correctly written and the computer has transmitted a "clear" signal.

In ticket position 8, although a Diverter Switch S–15A is closed, the "Used-Up Ticket" signal from the computer is not present so that gate AND–8A remains closed. The closed position of AND–8A will not permit a signal from Diverter Switch S–15A to be transmitted to the Diverter Solenoid DM (see also FIGURE 13).

While the ticket is traveling from ticket position 7 to ticket position 9, the computer is providing Nickel (code A–3) data to a Nickel Counter, which in turn steps the Nickel Motor NM to match the number of pulses received from the computer. In an identical manner, the computer is transmitting Dollar (code B–3) data to a Dollar Counter, and hence onto the Dollar Stepping Motor DM. This is accomplished in the following manner: Nickel pulses from zero to 19 generate information equivalent to zero cents to 95 cents. On the "Cents" axis of the ticket grid the stepping motor steps from zero to 95 cents (see also FIG. 17). The Dollar pulses are generated in the same fashion, that is, one pulse for each dollar value transmitted by the computer. The motor steps along the dollar axis of the grid side of the ticket from zero to as many dollars as are to be indicated on the ticket, by turning the drive 202 (FIGS. 15 and 17).

At ticket position 9, the Mark Start Switch S–12A closes, passing a signal through OR–2A which sets FF–13A, energizes the Mark Clutch CG–1 and releases brake B1–1. Since the printing head of the marking device has been preset by the Nickel stepping motor and Dollar stepping motor, energizing of CG–1 causes switch Disc DC–2 to rotate window 184*a*, passes in front of the read Switch S–13A. The read switch now is closed by its magnet, but the disc DC–2 coasts on enough for the window 184*a* to pass the read switch and block the magnet flux, S–13A in a manner identical to the way in which DC–1 operated for the Entry Gate. Closing Read Switch S–13A resets FF–13A which deenergizes the Mark Clutch CE–1 and sets Brake BI–1, but as mentioned, the disc DC–2 travels a full 180 degrees, as does the marker roll 202.

During the operation described above, an "X" is imprinted in the appropriate square of the ticket grid, the "X" indicates the remaining stored Dollar and Cents value of the ticket, namely, $19.75 in this example.

If no error has been detected, AND–7A is in the open position since it is assumed that every word is correctly written and that the computer has transmitted a "clear" signal.

In ticket position 10 (FIG. 19B) the End of Cycle Switch contact Switch S–7A*b* closes, setting FF–12A. Since AND–7A is open, the turnstile is permitted to rotate. Also, in ticket position 10, FF–1A and FF–3A are reset by S–7A*b*. The End Cycle signal from FF–12A, in addition to permitting the turnstile to rotate, starts clock No. 1 to operate for approximately 50 pulses. Since Switches S–10A and S–11A are closed whenever the Nickel stepping motor and Dollar stopping motors are off the "home position," the clock No. 1 pulses are transmitted to both counter No. 1 and counter No. 2. These pulses cause counter No. 1 and counter No. 2 to reset to zero, and in addition they step the Nickel stepping motor and Dollar stepping motor back to "home position." At the "home position" S–10A and S–11A open, and inhibit further pulses from clock No. 1. Meanwhile clock No. 1 continues pulsing until the approximate 50 pulses are completed and then the clock stops.

Double Entry Reject (Clutch CC)

Assume that there is a ticket located somewhere between position 4 and position 10. Under these conditions FF–1A is in the set position.

The balance of the operation is identical to the Entry Gate operation for this same condition.

Recycle Command-Ticket Clear

This operation is identical to that for Entry Gate.

Recycle Command-Ticket Bad

In the event the ticket moves forward and it has not been cleared the second time, the computer will transmit an "Invalid Ticket" signal to D–5A and light "See Agent" through K2–3A*b*. The computer will generate Dollar (B–3) data pulses of sufficient quantity to assure that the marker has been moved beyond the maximum value indicated on the ticket grid. As a result, no printing action is accomplished.

Also the computer does not transmit a "clear" signal to open AND–7A and the turnstile remains closed when it reaches ticket position 10. The ticket continues on from ticket position 10 out the slot and is presented to the passenger.

Used-Up Ticket operation

After the computer has read the magnetic information available at ticket position 5, and if it finds that the ride which the passenger has just taken has used up all of the stored value remaining in his ticket, the computer will send a "Used-Up Ticket" signal, which opens AND–8A. Meanwhile the ticket continues to ticket position 8, at which time Diverter Switch S–15A is closed. This permits the "Used-Up Ticket" signal to pass through and energize the Diverter Solenoid D*s*. The "Used-Up Ticket" signal also passed through OR–1A and resets FF–5A, which first energizes the main Clutch CB–1 and then the main Reverse Clutch, CD–1. The ticket, having having passed the diverter 190 (FIGURE 13), reverses direction and travels from ticket position 8 back past ticket position 6 (FIG. 19A) and because the diverter solenoid has operated, is diverted and continues on to the ticket chopper 192, 194 (FIG. 13) for destruction.

As the ticket passes the ticket captured switch S–14A (FIG. 19A), contact S–144A*b* closes and now performs the "End Cycle" function. Since the ticket was valid and has sufficient stored value a "Clear" signal is received from a computer at AND–7A and the turnstile is put in the open position so that the passenger may exit.

Add Fare operation

At ticket position 5 (FIG. 19A), the computer verifies that there is sufficient stored value in the ticket for the passenger to pay for the ride taken. Should the computer determine that there is *not* sufficient stored value in the ticket for the ride the passenger has taken, the computer transmits an "Add Fare" signal to D–10A which in turn lights up the "Add Fare" display 67 at the top of the gate.

As the ticket travels past ticket positions 6 and 7, no action by the computer is taken. While the ticket is traveling between ticket position 7 and ticket position 9 the Dollar stepping motor is pulsed to a Dollar value beyond that indicated on the grid of the ticket so as not to make any imprint on the ticket.

At ticket position 10 the "End Cycle" function will proceed in a normal fashion but since the "Clear" signal has not been transmitted by the computer to AND–7A, the turnstile will not open and the passenger cannot exit. meanwhile the invalid ticket is returned to the passenger in its original condition at ticket position 1.

Having completed a detailed description of the invention so that those skilled in the art may practice the same, it can be seen how the system of the present invention provides the features and advantages set forth in the opening résumé.

Hence, we claim:

1. Apparatus for providing machine-readable and printed transaction value data on a ticket having a magnetic strip along one edge thereof and a coordinate-grid having two perpendicular coordinates, the intersections of which provide for visually initially indicating ticket value data; said apparatus comprising a ticket conveyor having ticket receiving and delivery ends, a magnetic strip reading magnet for reading data initially magnetically encoded on the magnetic strip and sending it to a computer, a magnetic strip writing head for receiving new value data from the computer and writing it on the strip, and a coordinate-grid marker for receiving new value data from the computer and indicating it visually on the coordinate grid, said marker comprising a ticket marking drum having a single punch, means for holding the ticket against said drum, means for sliding said punch along the drum axis and for turning the drum and punch from a reference position thereby positioning the punch in perpendicular directions corresponding to the two coordinates of the ticket grid, and means for rotating the drum and punch for marking the new value data on the grid of the ticket without effacing previous, higher ticket value indications.

2. Apparatus for providing machine-readable and human-readable data on a ticket or the like comprising a ticket receiving and delivery conveyor, data read and write units disposed along said conveyor, and a coordinate-grid marking device following said read unit, said marking device comprising a ticket marking drum, a backup drum in ticket driving engagement with said marking drum, a single punch slidable axially along the marking drum, remote control means for turning said marking drum to position the punch on one grid axis, remote control means for sliding the punch along the marking drum axis for positioning the punch on the other grid axis, and means for disengaging the remote control drum turning means from the marking drum while turning said marking drum and previously positioned punch through a fixed arc for both marking and advancing a ticket that lies between said drums.

3. The apparatus of claim 2, wherein means are provided for returning the marking drum and the punch on the drum to a home position after each cycle.

4. The apparatus of claim 3, wherein said remote control means comprises a pair of stepping motors.

References Cited

UNITED STATES PATENTS

| | | | |
|---|---|---|---|
| 2,407,196 | 9/1946 | Watson | 235—61.9 |
| 2,659,470 | 11/1953 | Dupont. | |
| 2,783,865 | 3/1957 | Cleave | 200—46 XR |
| 3,212,615 | 10/1965 | Hellar. | |
| 3,222,057 | 12/1965 | Couri | 194—4 |
| 3,287,543 | 11/1966 | Halpern. | |
| 3,356,021 | 12/1967 | May et al. | |

MAYNARD R. WILBUR, Primary Examiner

T. J. SLOYAN, Assistant Examiner

PO-1050
(5/69)

UNITED STATES PATENT OFFICE
CERTIFICATE OF CORRECTION

Patent No. 3,501,622            Dated   March 17, 1970

Inventor(s)   S. M. WEIR et al

It is certified that error appears in the above-identified patent and that said Letters Patent are hereby corrected as shown below:

Column 1, line 45 - change "marking" to --markings--.
Column 4, line 69 - change "28" to --128--.
Column 11, line 32 - change "ot" to --to--.
Column 12, line 41 - change "povided" to --provided--.
Column 12, line 54 - change "216" to --206--.
Column 17, line 6 - change "S-144Ab" to --S14Ab--.
Column 12, line 54 - change "ot" to --to--.

Signed and sealed this 20th day of July 1971.

(SEAL)
Attest:

EDWARD M. FLETCHER, JR.                    WILLIAM E. SCHUYLER, JR.
Attesting Officer                          Commissioner of Patents